(12) United States Patent
Okamura et al.

(10) Patent No.: US 8,157,075 B2
(45) Date of Patent: Apr. 17, 2012

(54) WET FRICTION MATERIAL

(75) Inventors: Hiroki Okamura, Nagoya (JP); Yoshihito Fujimaki, Toyota (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 828 days.

(21) Appl. No.: 12/194,027

(22) Filed: Aug. 19, 2008

(65) Prior Publication Data
US 2009/0050434 A1 Feb. 26, 2009

(30) Foreign Application Priority Data

Aug. 20, 2007 (JP) .................. 2007-213406
Jun. 16, 2008 (JP) .................. 2008-156667

(51) Int. Cl.
*F16D 13/64* (2006.01)
*F16D 13/72* (2006.01)
(52) U.S. Cl. .............. 192/107 R; 192/113.36
(58) Field of Classification Search .............. 192/113.36
See application file for complete search history.

(56) References Cited

U.S. PATENT DOCUMENTS

| | | |
|---|---|---|
| 5,094,331 A | 3/1992 | Fujimoto et al. |
| 6,019,205 A | 2/2000 | Willwerth et al. |
| 6,293,382 B1 * | 9/2001 | Nishide et al. ............ 192/107 R |
| 6,712,190 B2 * | 3/2004 | Kitaori et al. ............ 192/113.36 |
| 2009/0053475 A1 * | 2/2009 | Higashijima et al. ......... 428/172 |

FOREIGN PATENT DOCUMENTS

| | | |
|---|---|---|
| EP | 2004/076896 A | 3/2004 |
| EP | 1783390 A2 | 5/2007 |
| JP | 2001-295859 A | 10/2001 |
| JP | 2004-150449 A | 5/2004 |
| JP | 2005-069411 A | 3/2005 |
| JP | 2005-282648 A | 10/2005 |
| JP | 2006-132581 A | 5/2006 |
| WO | 2009/021569 A1 | 2/2009 |

* cited by examiner

Primary Examiner — Richard M. Lorence
(74) Attorney, Agent, or Firm — Sughrue Mion, PLLC

(57) ABSTRACT

Provided is a wet friction material that includes a ring shaped flat metal core and a plurality of segment-type friction material substrates joined onto one or both of surfaces of the ring shaped flat metal core with an adhesive and spaced apart along an entire circumference of the ring shaped flat metal core to form a plurality of oil grooves extending in a radial direction of the core metal by a clearance between adjacent ones of the above segment pieces. One or both of outer peripheral corner portions of each of the plurality of segment-type friction material substrates is chamfered to form a chamfered part such that a width of the oil grooves adjacent the chamfered part of the corner portions is larger than a width of a thinnest portion of the above plurality of the oil grooves.

5 Claims, 12 Drawing Sheets

1, 1A, 1C wet friction material
2 core metal
3, 3A, 3B, 3C segment piece
3a, 3Aa, 3Ba, 3Ca cut (chamfering processing)
4, 4A, 4B, 4C oil groove 1F wet friction material

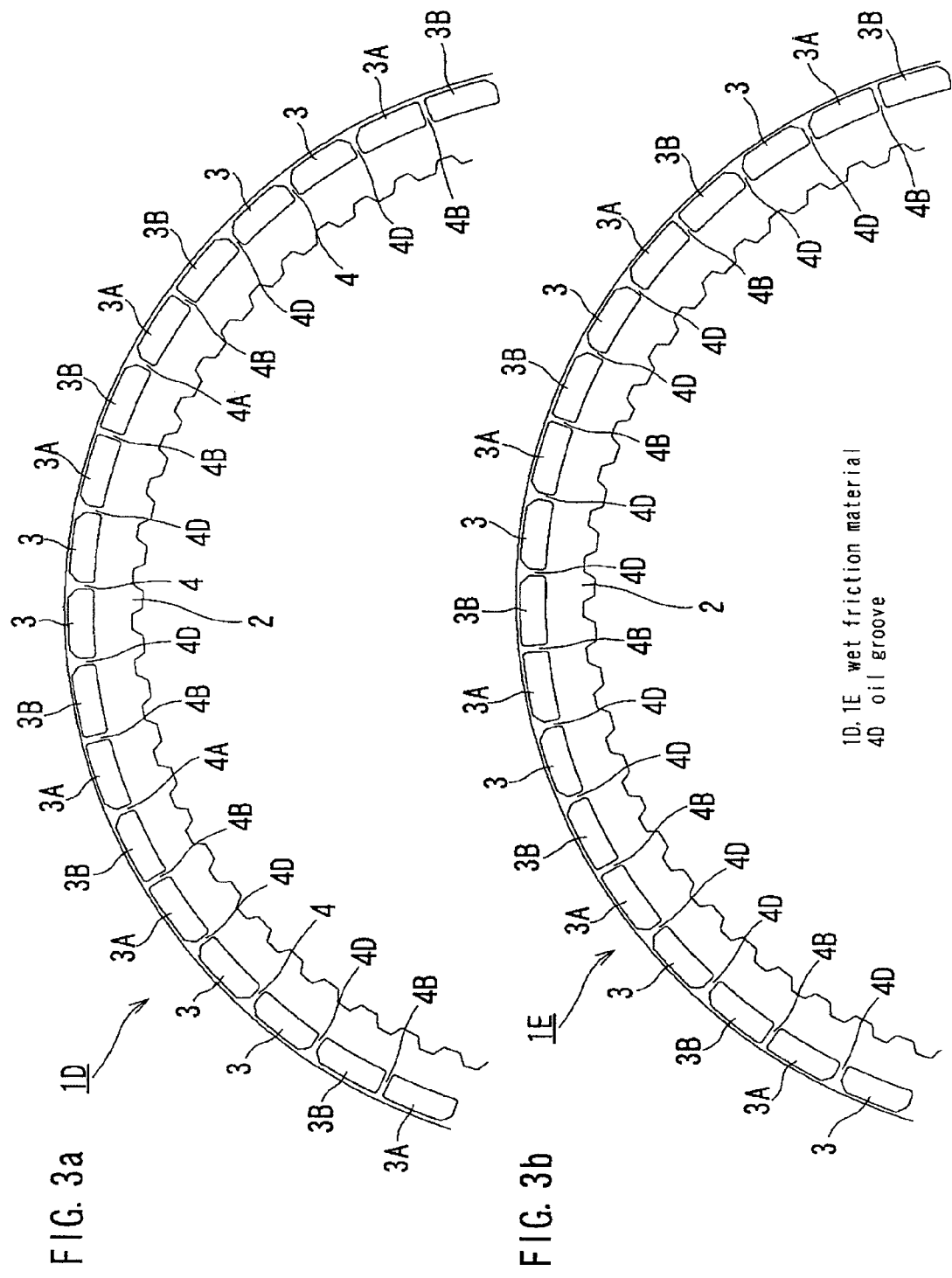

3D, 3E, 3F, 3G, 3H, 3I  segment piece
3g, 3h, 3i  dent

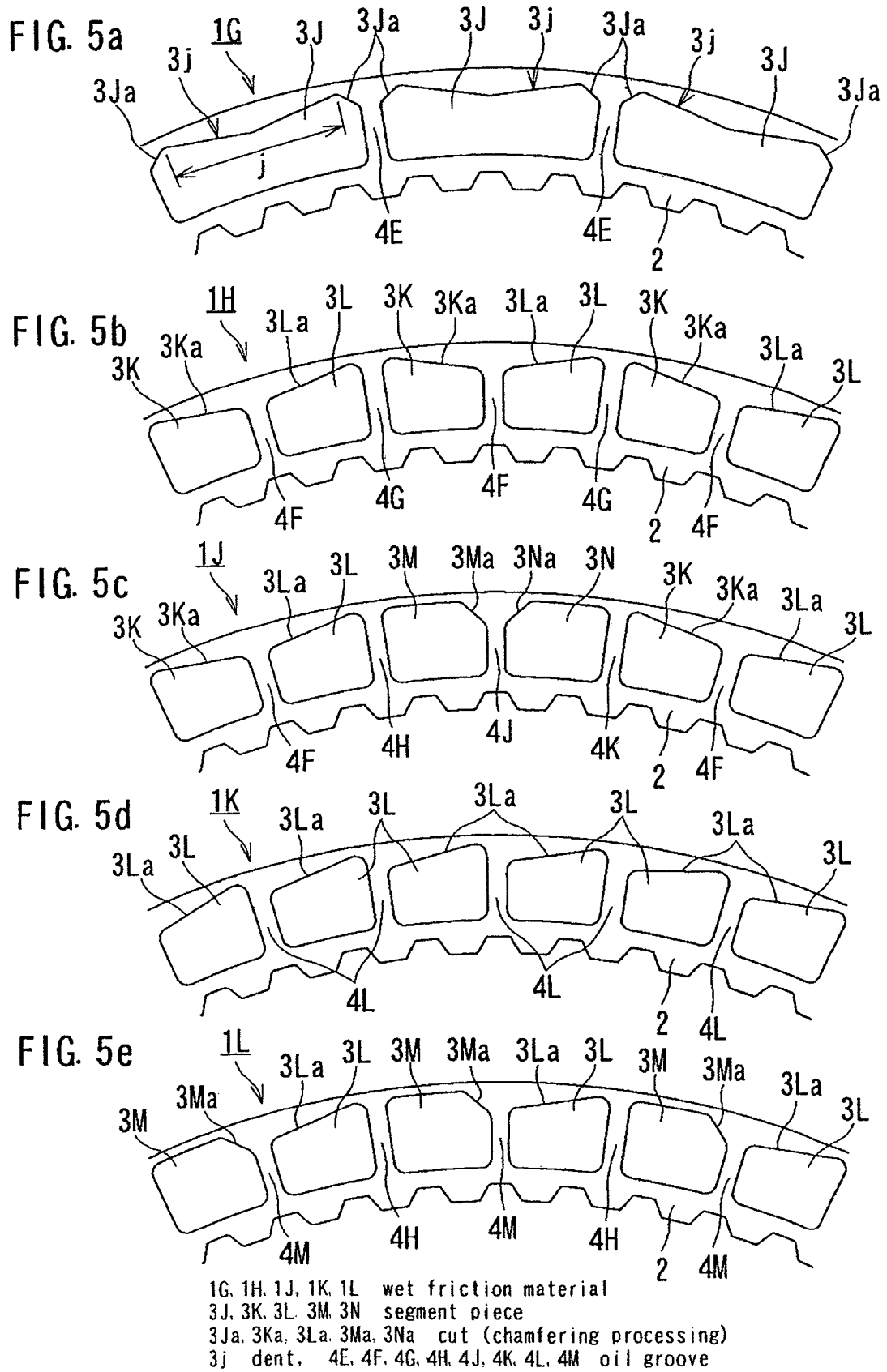

6, 6A, 6C  wet friction material
7  ring-shaped friction material substrate
8, 8A, 8B, 8C  island shaped portion
8a, 8Aa, 8Ba, 8Ca  chamfering processing
9, 9A, 9B, 9C  oil groove 6D, 6E, 6F  wet friction material
8D, 8E, 8F  island shaped portion
8Da, 8Ea, 8Fa  chamfering processing
8d  凹部 dent
9D, 9E, 9F  oil groove
10  ring-shaped friction material substrate 6G, 6H, 6J  wet friction material
8G, 8H  island shaped portion
8Ga, 8Ha  chamfering processing
9G, 9H, 9J, 9K, 9L  oil groove

WET FRICTION MATERIAL

BACKGROUND OF THE INVENTION

1. Field of the Invention

This invention relates to a wet friction material that generates a torque by applying a high pressure to an opposite surface while being immersed in oil. In detail, this invention relates to a segment-type friction material made by joining friction material substrates that were cut into a segment piece onto one or both of surfaces of a core metal of a flat ring shape along an entire circumference thereof with an adhesive. Otherwise, this invention relates to a ring-type friction material made by pressing or cutting one or both of surfaces of a friction material of a ring shape that has ring-shaped friction material substrates joined onto one or both of surfaces of a core metal of a flat ring shape thereof with an adhesive so as to form a plurality of oil grooves in a radial direction.

2. Description of the Related Art

In recent years, a segment-type friction material has been developed as a wet friction material in order to improve a material yield with resultant cost reduction and to lessen a drag torque with resultant high fuel efficiency in a vehicle. The segment-type friction material is made by that friction material substrates that were cut into a segment piece along the flat ring shape are arranged and joined with an adhesive on a front surface of the core metal of the flat ring shape side-by-side along the entire circumference of the core metal with a gap to be an oil groove, and similarly another set of the segment-piece-shaped friction material substrates are joined with an adhesive to a rear surface of the core metal also. Such a segment-type friction material is applicable to an automatic transmission which may be referred to as "AT" hereafter of an automobile or the like or a friction material engaging device applied single or plural friction plates, which is used for a transmission of a motorcycle or the like.

As an example, a wet hydraulic clutch is used for an automatic transmission of an automobile or the like. The wet hydraulic clutch has a plurality of segment-type friction materials and a plurality of separator plates laid alternately on each other. Then, both the plates are contacted with a hydraulic pressure to transmit a torque. A lubricating oil (automatic transmission fluid, which may be referred to as "ATF" hereafter) is supplied to between both the plates for the purpose of absorbing a frictional heat generated when they are shifted from a disengaged state to an engaged state or preventing abrasion of friction material or the like. ("ATF" is a registered trademark of Idemitsu Kosan Co., Ltd.)

However, a distance between the segment-type friction material and a counterpart separator plate is set small so as to increase response of the hydraulic clutch. Moreover, a total area of an oil passage provided on the segment-type friction material is restricted so as to assure a sufficient torque transmission capacity when the hydraulic clutch is engaged. As a result, it becomes hard to discharge ATF remaining between the segment-type friction material and the separator plate when the hydraulic clutch is released and there was a problem that it generated a drag torque by ATF caused by a relative rotation of both the plates.

Therefore, in Japanese Laid Open Patent Publication No. 2001-295859, it is disclosed an invention regarding a wet friction member characterized in that division formation is carried out to oil grooves which are formed in between adjacent segment pieces and a distance of the oil groove makes narrow on the way from an inner peripheral side to an outer peripheral side. Hereby, ATF which runs from the inner peripheral side to the outer peripheral side is kept back at a point where the distance of the oil groove changes and certain ATF overflow and run to a front surface of the segment pieces, therefore it makes to be capable of reducing the drag torque as well as improving a heat resistance by improving a cooling effect of ATF.

Moreover, according to an invention described in Japanese Laid Open Patent Publication No. 2005-069411, two sides which are attached R in a reverse direction of the core metal of the segment piece are joined with an adhesive so as to be an inner periphery and an outer periphery. Therefore, it attaches R which goes up toward the direction of the oil groove to the inner periphery and a width of an outer peripheral opening portion of a gap to be an oil groove is larger than a width of an inner peripheral opening portion of the gap. Thus, it can significantly improve a discharging efficiency of ATF by idle running of the segment-type friction material and it can also substantially reduce the drag torque resulting from ATF.

Furthermore, according to an invention described in Japanese Laid Open Patent Publication No. 2005-282648, there is provided a segment-type friction material that when the segment-type friction material rotates in a disengaged state in case of being assembled into AT by cutting off a corner of the inner peripheral side of the segment piece at a predetermined angle, ATF is positively supplied to a friction surface of friction material substrates by that ATF which is supplied from the inner peripheral side touches a portion where the segment pieces were cut off, therefore it can restrain contact of a separator plate and the friction surface and considerably reduce the drag torque resulting from ATF.

Additionally, in Japanese Laid Open Patent Publication No. 2004-150449, in a segment-type friction material, it is disclosed an invention that it attaches R at four corners of the segment piece or it chamfers the four corners of the segment piece so as to prevent the segment piece from peeling by increasing a hydraulic pressure of ATF which touches a side surface of the segment piece (surface which consists of oil grooves). As a result, it is considered to be able to obtain a reduction effect of the drag torque resulting from ATF in case that shapes of the four corners of the segment piece are appropriate, while it significantly improves the peeling resistance.

However, in the technique described in the above patent publication No. 2001-295859, No. 2005-069411 and No. 2005-282648, it is assumed that ATF is supplied from the inner peripheral side of the core metal of the segment-type friction material. In an actual equipment, in case of a specification that there is no ATF supply from a hub hole or in case that a stirred torque increases by generating oil retained at the outer periphery, the drag torque reduction effect is not enough yet, and there is a problem that it is hard to bring a significant high efficiency in a vehicle.

Additionally, in the technique described in the above patent publication No. 2004-150449, it aims only to prevent the segment piece from peeling, therefore R or chamfering of four corners of the segment piece described in this embodiment is too small to obtain a drag torque reduction effect and it does not show an appropriate range of a size of R or chamfering of the four corners of the segment piece to reduce the drag torque. Moreover, there is a problem that all of the four corners of the segment piece are needed to make R processing or chamfering processing, which is not always required for the drag torque reduction.

As a result, an object of this invention is to provide a wet friction material that can certainly obtain a more significant drag torque reduction effect even in case that the stirred torque increases by generating oil retained at the outer periphery or in case of a specification that there is no lubricating oil supply from the inner peripheral side.

BRIEF SUMMARY OF THE INVENTION

According to a first aspect of the invention, there is provided a segment-type wet friction material made by joining friction material substrates that were cut into a segment piece along the above flat ring shape onto one or both of surfaces of the core metal of the flat ring shape along the entire circumference thereof with an adhesive so as to form a plurality of oil grooves in a radial direction by a gap between adjacent segment pieces mentioned above. Otherwise, there is provided a ring-type wet friction material made by pressing or cutting ring-shaped friction material substrates joined onto one or both surfaces of the core metal of the flat ring shape thereof with an adhesive so as to form a plurality of oil grooves in a radial direction, while leaving an island shaped portion. Additionally, one or both of the outer peripheral corner portions of the above island shaped portion or the above segment piece which is bounded by the above plurality of the oil grooves is made R processing or chamfering processing.

According to a second aspect of the invention, there is provided a wet friction material that it attaches an oil groove that an outer peripheral opening portion is a symmetrical shape and it extends over four times as a width of the thinnest portion of the above plurality of the oil grooves at least every two of the above plurality of the oil grooves, while all of the above plurality of the oil grooves are symmetrical shapes in composition of claim 1. Here, "at least every two of the above plurality of the oil grooves" means that at least every two of the oil grooves, it attaches an oil groove that the outer peripheral opening portion extends over four times as the width of the thinnest portion of the oil grooves, and there is a possibility that an oil groove that the outer peripheral opening portion does not extend or the oil groove that the outer peripheral opening portion extends is applied over two consecutive.

According to a third aspect of the invention, there is provided a wet friction material that all of the outer peripheral opening portions of the above plurality of the oil grooves are symmetrical shapes and it extends over four times as the width of the thinnest portion of the above plurality of the oil grooves, while all of the above plurality of the oil grooves are symmetrical shapes in composition of claim 1.

According to a fourth aspect of the invention, in one of compositions of claim 1 to claim 3, there is provided a wet friction material that a circumferential width of the above R processing or the above chamfering processing is 3 mm and more or 15% to 50% of a circumferential width of the above segment piece or the above island shaped portion. And yet, the circumferential width of the above R processing or the above chamfering processing is over three times of the width of the thinnest portion of the above plurality of the oil grooves. Also, a radial width of the above R processing or the above chamfering processing is within a range of 20% to 100% of a radial width of the above segment piece or the above island shaped portion.

According to a fifth aspect of the invention, in one of compositions of claim 1 to claim 4, there is provided a wet friction material that a dent in the outer peripheral side is also applied to a center portion of the outer peripheral side of the above island shaped portion or the above segment piece which is bounded by the above plurality of the oil grooves.

According to the first aspect of the invention, there is provided a segment-type wet friction material made by joining friction material substrates that were cut into a segment piece along the flat ring shape onto one or both of surfaces of the core metal of the flat ring shape along the entire circumference thereof with an adhesive so as to form a plurality of oil grooves in the radial direction by a gap between adjacent segment pieces. Otherwise, there is provided a ring-type wet friction material made by pressing or cutting ring-shaped friction material substrates joined onto one or both surfaces of the core metal of the flat ring shape thereof with an adhesive so as to form a plurality of oil grooves in the radial direction, while leaving the island shaped portion. Additionally, one or both of corner portions of the outer peripheral side of the island shaped portion or the segment piece which is bounded by the plurality of the oil grooves is made R processing or chamfering processing.

That is, outer peripheral opening portions of the plurality of the oil grooves are extended in a curved line or a straight line and a lubricating oil which flows into from the outer peripheral side of the wet friction material is kept back at an extended portion where it made R processing or chamfering processing, thereby a space is sufficiently assured for the lubricating oil to flow into the outer periphery of the wet friction material as well as easily running over to the front surface of the segment piece or the island shaped portion.

In such compositions, when the wet friction material rotates in either direction in a disengaged state, in case of a specification that there is no lubricating oil supply from the inner peripheral side, the lubricating oil which is supplied from the outer peripheral side is kept back at the extended portion where it made R processing or chamfering processing and runs over to the front surface of the segment piece or the island shaped portion and then only the wet friction material rotates smoothly so as to assure a distance between the wet friction material and a separator plate. Moreover, even in case of a specification that there is the lubricating oil supply from the inner peripheral side, it can certainly prevent a drag torque from increasing by generating oil retained at the outer periphery because there is a space for the lubricating oil to flow into the outer periphery of the wet friction material sufficiently.

Accordingly, there is provided a wet friction material that is able to obtain a more significant drag torque reduction effect certainly even in case of a specification that there is no lubricating oil supply from the inner peripheral side or in case that a stirred torque increases by generating oil retained at the outer periphery.

According to the second aspect of the invention, there is provided a wet friction material that at least every two of a plurality of oil grooves, it attaches an oil groove that the outer peripheral opening portion is a symmetrical shape and it extends over four times as the width of the thinnest portion of the plurality of the oil grooves, while all of the plurality of the oil grooves are symmetrical shapes. Here, "at least every two of a plurality of oil grooves" means that it attaches an oil groove that the outer peripheral opening portion extends over four times as the width of the thinnest portion of the oil grooves at least every two of the oil grooves. And there is a possibility that an oil groove that the outer peripheral opening portion does not extend or the oil groove that the outer peripheral opening portion extends is applied over two consecutive.

Therefore, in addition to the advantages of the invention of claim 1, it can obtain an advantageous effect that is able to obtain an equivalent drag torque reduction effect even when the wet friction material rotates in either direction. Furthermore, it can certainly obtain a more significant drag torque reduction effect because the outer peripheral opening portion is extended over four times as the width of the thinnest portion of the oil grooves at least every two of the plurality of the oil grooves.

Accordingly, there is provided a wet friction material that is able to obtain a more significant drag torque reduction effect certainly even in case of a specification that there is no lubricating oil supply from the inner peripheral side or in case that a stirred torque increases by generating oil retained at the outer periphery.

According to the third aspect of the invention, there is provided a wet friction material that all of outer peripheral opening portions of a plurality of oil grooves are symmetrical shapes and it extends over four times as the width of the thinnest portion of the plurality of the oil grooves, while all of the plurality of the oil grooves are symmetrical shapes.

Therefore, in addition to the advantages of the invention of claim 1, it can obtain an advantageous effect that is able to obtain an equivalent drag torque reduction effect even when the wet friction material rotates in either direction. Furthermore, it can obtain a more significant drag torque reduction effect more certainly because all of the outer peripheral opening portions of the plurality of the oil grooves are extended over four times as the width of the thinnest portion of the oil grooves.

Accordingly, there is provided a wet friction material that is able to obtain a more significant drag torque reduction effect more certainly even in case of a specification that there is no lubricating oil supply from the inner peripheral side or in case that a stirred torque increases by generating oil retained at the outer periphery.

According to the fourth aspect of the invention, there is provided a wet friction material that the circumferential width of R processing or chamfering processing is 3 mm and more or 15% to 50% of the circumferential width of the segment piece or the island shaped portion. And yet, it is over three times of the width of the thinnest portion of a plurality of oil grooves. Also, the radial width of R processing or chamfering processing is within a range of 20% to 100% of the radial width of the segment piece or the island shaped portion.

As a result of an accomplishment of keen and hard experimental study by this inventors, they have finally found that it requires that the circumferential width of R processing or chamfering processing is 3 mm and more or 15% to 50% of the circumferential width of the segment piece or the island shaped portion, and yet the circumferential width of the R processing or the chamfering processing is over three times as the width of the thinnest portion of a plurality of oil grooves, and also the radial width of R processing or chamfering processing is within a range of 20% to 100% of the radial width of the segment piece or the island shaped portion so as to obtain a drag torque reduction effect more effectively in the wet friction material. Then, they have completed this invention on the basis of above their knowledge.

That is, when the circumferential width of R processing or chamfering processing is less than 3 mm or less than 15% of the circumferential width of the segment piece or the island shaped portion, the width of the outer peripheral opening portion formed at the outer peripheral side of the oil groove of the wet friction material becomes small and there is a possibility that an amount of the lubricating oil which is supplied from the outer peripheral side and runs over the front surface of the segment piece or the island shaped portion becomes shortage. And there is also a possibility that it does not obtain a significant drag torque reduction effect by generating oil retained at the outer periphery because it does not assure a sufficient space for the lubricating oil to flow into the outer periphery of the wet friction material.

In contrast, when the circumferential width of R processing or chamfering processing is over 50% of the circumferential width of the segment piece or the island shaped portion, there is a possibility that it does not supply the lubricating oil from the outer peripheral side smoothly due to too much extended width of the outer peripheral opening portion. Also, in case the segment piece or the island shaped portion is made R processing or chamfering processing to mold it into a symmetrical shape, the circumferential width of the processing is limited to 50% of the circumferential width of the segment piece or the island shaped portion.

Also, it is preferable that the circumferential width of R processing or chamfering processing is over three times as the width of the thinnest portion of a plurality of oil grooves, that is, the width of the outer peripheral opening portion is over four times as the width of the thinnest portion of the oil grooves (in case of making R processing or chamfering processing to only one side of the oil groove) or over seven times as the width of the thinnest portion of the oil grooves (in case of making R processing or chamfering processing to both sides of the oil groove).

Moreover, when the radial width of R processing or chamfering processing is less than 20% of the circumferential width of the segment piece or the island shaped portion, there is a possibility that a depth of the outer peripheral opening portion formed at the outer peripheral side of the oil groove of the wet friction material shallows and the amount of the lubricating oil which is supplied from the outer peripheral side and runs over the front surface of the segment piece or the island shaped portion becomes shortage. There is also a possibility that it does not obtain a sufficient drag torque reduction effect by generating oil retained at the outer periphery because a sufficient space for the lubricating oil to flow into the outer periphery of the wet friction material is not assured. Then, the circumferential width of R processing or chamfering processing is limited to 100% of the radial width of the segment piece or the island shaped portion.

Here, it is much preferable that the circumferential width of R processing or chamfering processing is within a range of 25% to 40% of that of the segment piece or the island shaped portion and the radial width of R processing or chamfering processing is within a range of 25% to 50% of the circumferential width of the segment piece or the island shaped portion since it can obtain a sufficient drag torque reduction effect more certainly thereof.

Accordingly, there is provided a wet friction material that is able to obtain a more significant drag torque reduction effect more certainly even in case of a specification that there is no lubricating oil supply from the inner peripheral side or in case that a stirred torque increases by generating oil retained at the outer periphery.

According to the fifth aspect of the invention, there is provided a wet friction material that a dent in the outer peripheral side is also applied to the center portion of the outer peripheral side of the island shaped portion or the segment piece which is bounded by a plurality of oil grooves.

Thus, the lubricating oil which is supplied from the outer peripheral side runs over the front surface of the segment piece or the island shaped portion not only from a portion of R processing or chamfering processing but also from the dent, it can obtain a much more significant drag torque reduction effect more certainly. Also, it can prevent a drag torque from increasing by generating oil retained at the outer periphery more certainly because the space for the lubricating oil of the outer periphery of the wet friction material to flow is much extended.

Accordingly, there is provided a wet friction material that is able to obtain a more significant drag torque reduction effect more certainly even in case of a specification that there is no lubricating oil supply from the inner peripheral side or in case that a stirred torque increases by generating oil retained at the outer periphery.

BRIEF DESCRIPTION OF THE SEVERAL
VIEWS OF THE DRAWINGS

FIG. 3a, 3b are plane views showing a part of a wet friction material according to other modified examples of the first embodiment of the invention.

FIGS. 4a, 4b, 4c, 4d, 4e, and 4f are plane views showing shapes of segment pieces which are used for the wet friction material according to other modified examples of the first embodiment of the invention.

FIG. 5a is a plane view showing a part of a wet friction material according to a fourth modified example of the first embodiment of the invention.

FIG. 5b is a plane view showing a part of a wet friction material according to a fifth modified example of the first embodiment of the invention.

FIG. 5c is a plane view showing a part of a wet friction material according to a sixth modified example of the first embodiment of the invention.

FIG. 5d is a plane view showing a part of a wet friction material according to a seventh modified example of the first embodiment of the invention.

FIG. 5e is a plane view showing a part of a wet friction material according to an eighth modified example of the first embodiment of the invention.

Figure 6A:
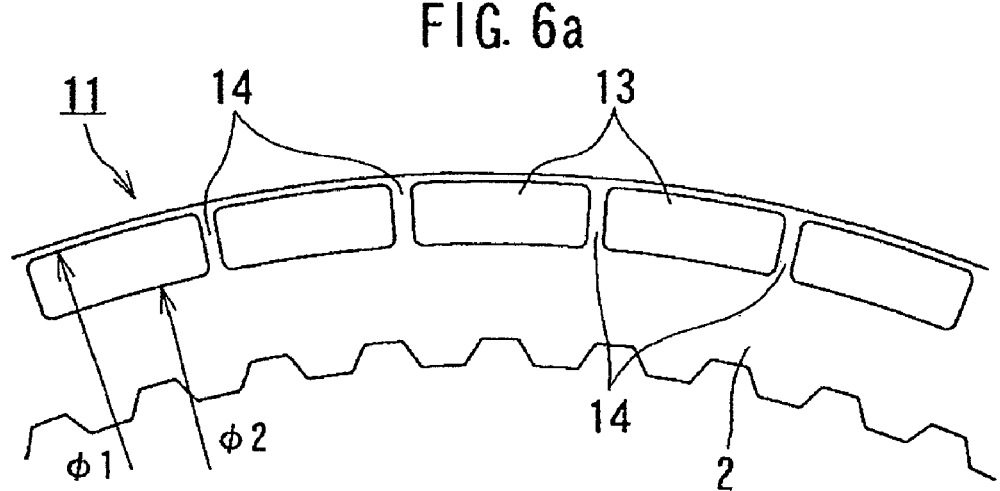

FIG. 6a is a plane view showing a part of a wet friction material (first comparative example) according to the first example of a conventional art.

Figure 6B:
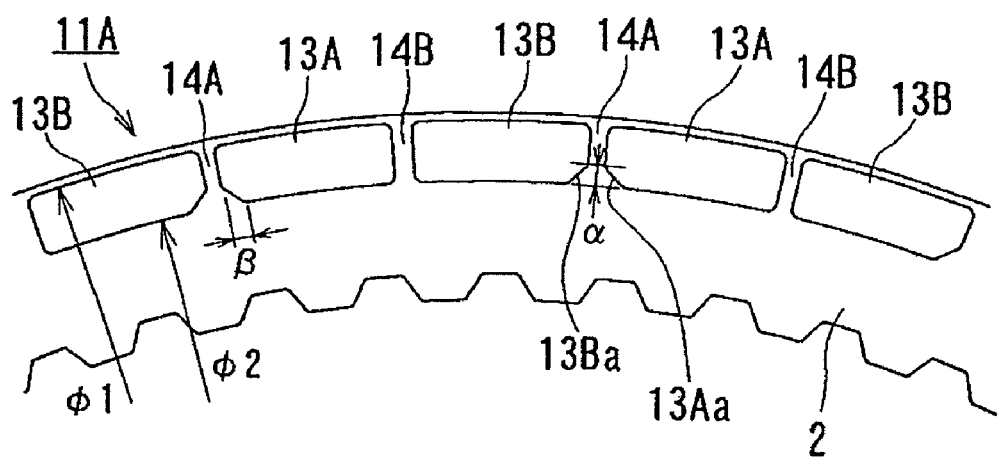

FIG. 6b is a plane view showing a part of a wet friction material (second comparative example) according to the second example of the conventional art.

Figure 6C:
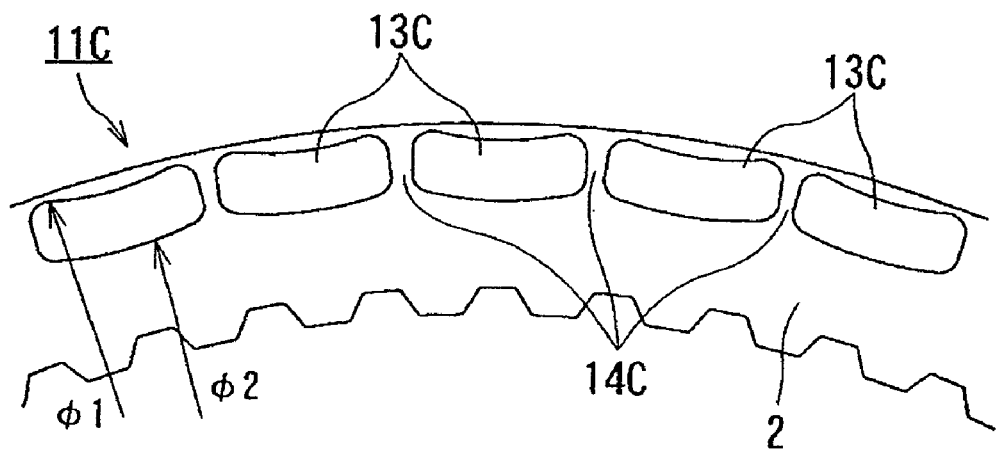

FIG. 6c is a plane view showing a part of a wet friction material (third comparative example) according to the third example of the conventional art.

Figure 7:
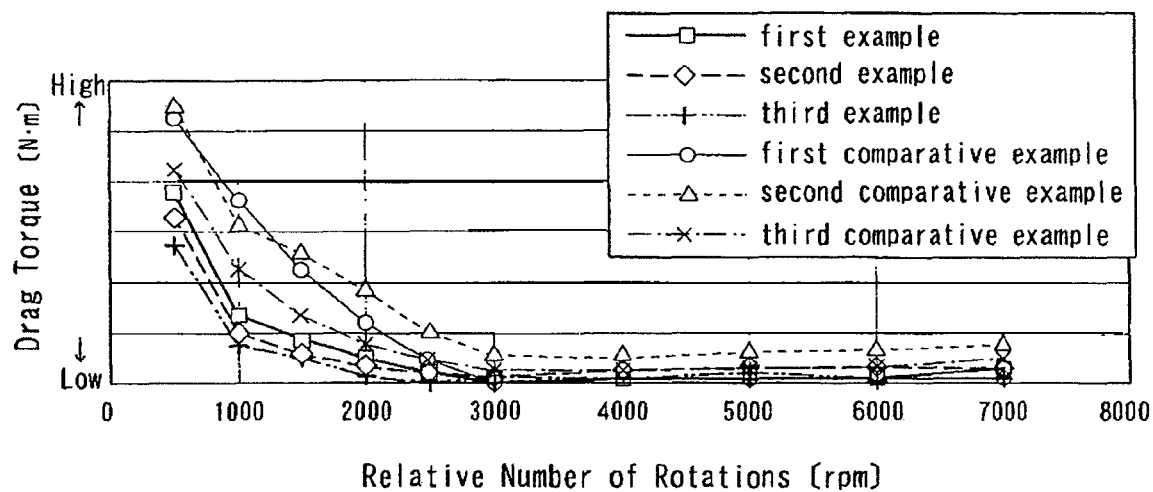

FIG. 7 is a graph showing a relation between a relative rotating speed and a drag torque in the wet friction material (the first to third examples) according to the first embodiment of the invention, while compared with the conventional wet friction material (the first to third comparative examples).

Figure 8:
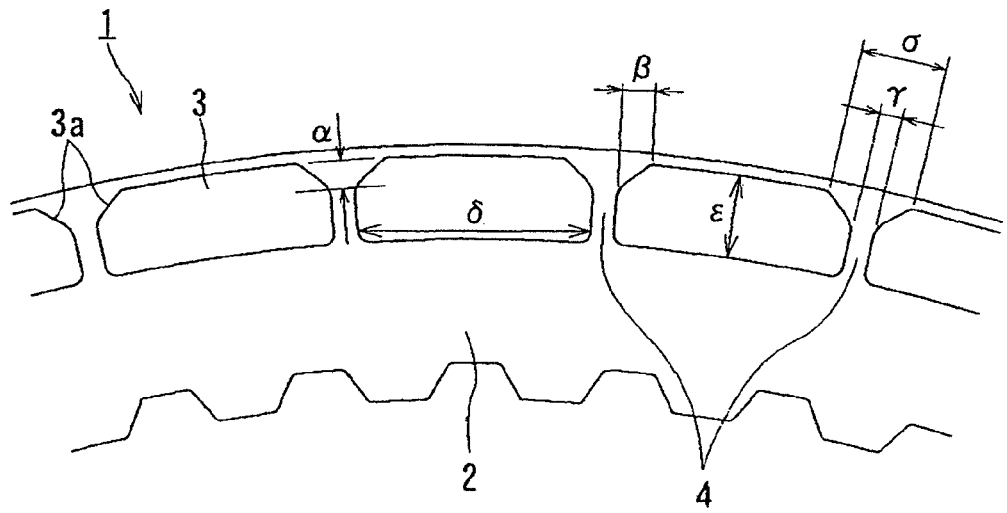

FIG. 8 is a view showing a relation of each parameter in the wet friction material (first example) according to the first embodiment of the invention.

Figure 9:
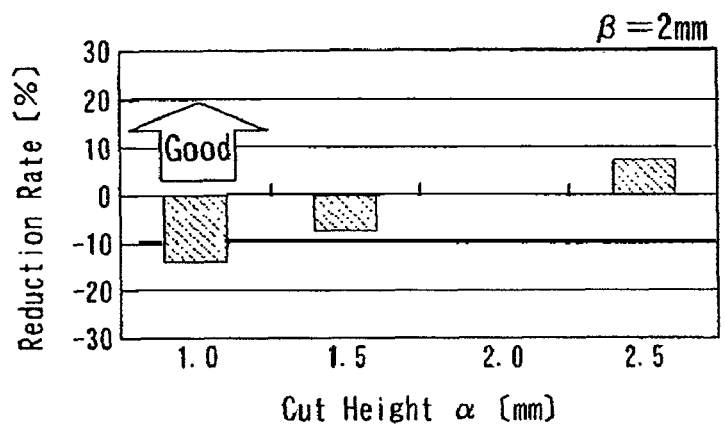

FIG. 9 is a graph showing a relation between a cut height (radial width) of an outer peripheral corner portion of an oil groove and a drag torque reduction rate in the wet friction material (first example) according to the first embodiment of the invention.

Figure 10:
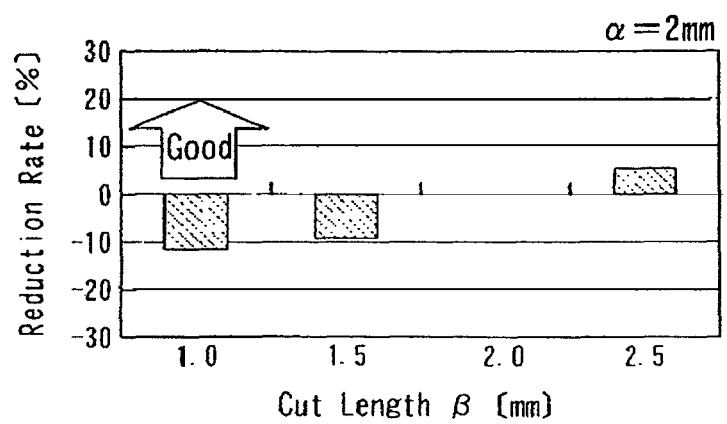

FIG. 10 is a graph showing a relation between a cut length (circumferential width) of the outer peripheral corner portion of the oil groove and the drag torque reduction rate in the wet friction material (first example) according to the first embodiment of the invention.

Figure 11A:
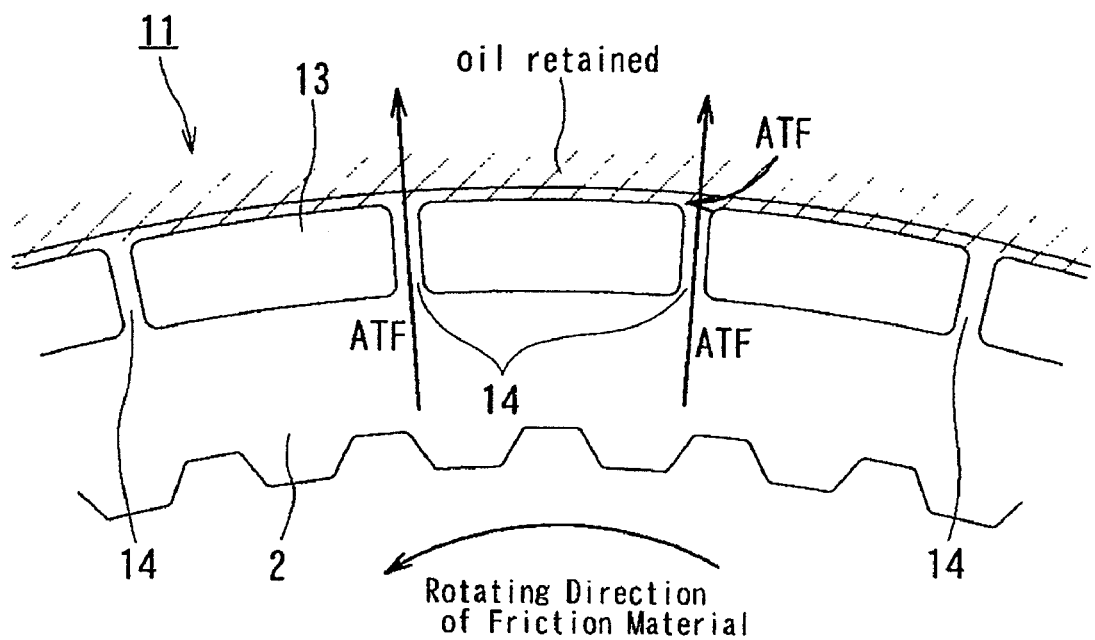

FIG. 11a is an explanatory diagram showing a generation of the drag torque in the wet friction material (first comparative example) of the conventional art.

Figure 11B:
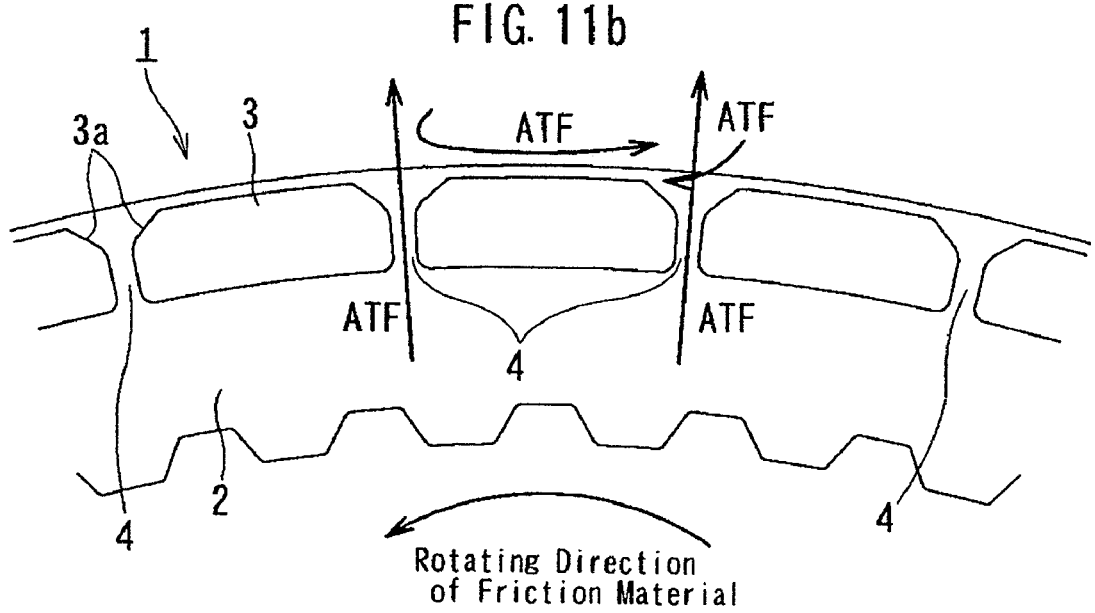

FIG. 11b is an explanatory diagram showing a drag torque reduction effect in the wet friction material (first example) according to the first embodiment of the invention.

Figure 12A:
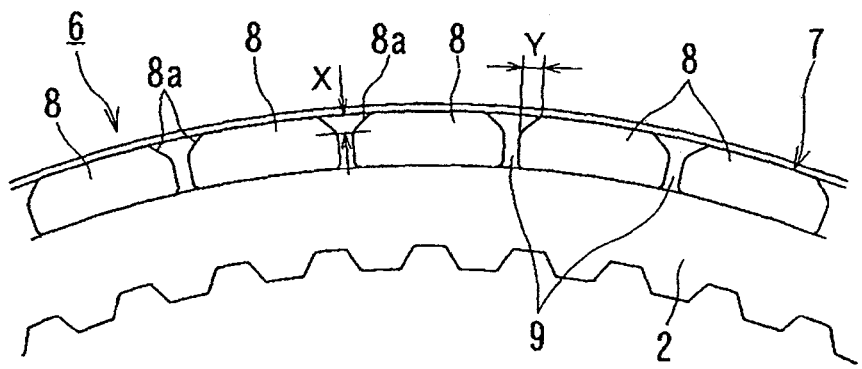

FIG. 12a is a plane view showing a part of a wet friction material according to a second embodiment of the invention.

Figure 12B:
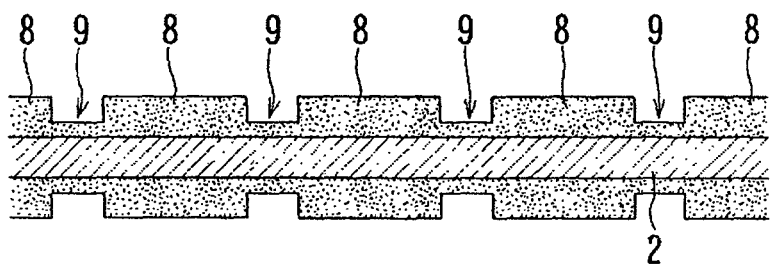

FIG. 12b is a partial sectional view showing a vertical section of the wet friction material according to the second embodiment of the invention.

Figure 12C:
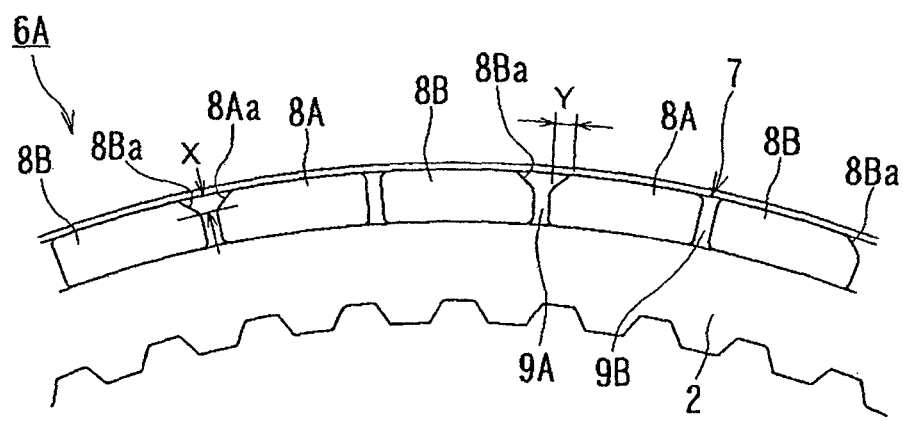

FIG. 12c is a plane view showing a part of a wet friction material according to a first modified example of the second embodiment of the invention.

Figure 12D:
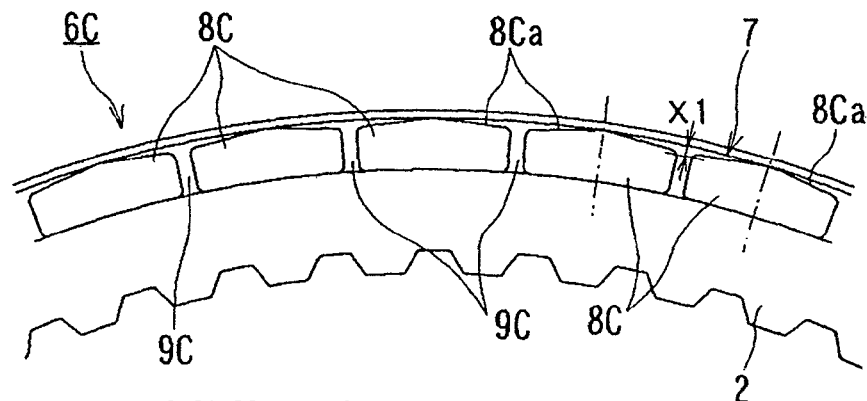

FIG. 12d is a plane view showing a part of a wet friction material according to a second modified example of the second embodiment of the invention.

Figure 13A:
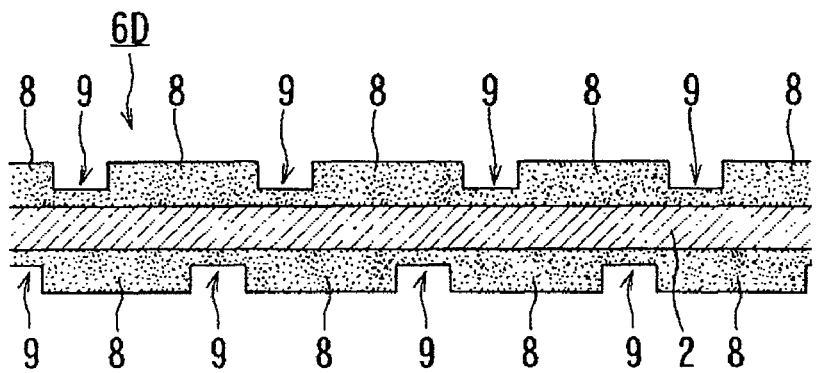

FIG. 13a is a partial sectional view showing a vertical section of a wet friction material according to a third modified example of the second embodiment of the invention.

Figure 13B:
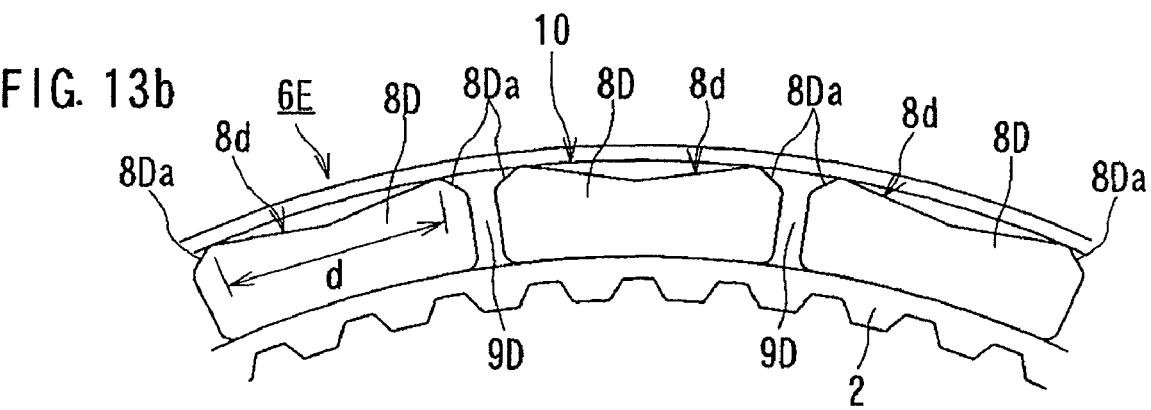

FIG. 13b is a plane view showing a part of a wet friction material according to a fourth modified example of the second embodiment of the invention.

Figure 13C:
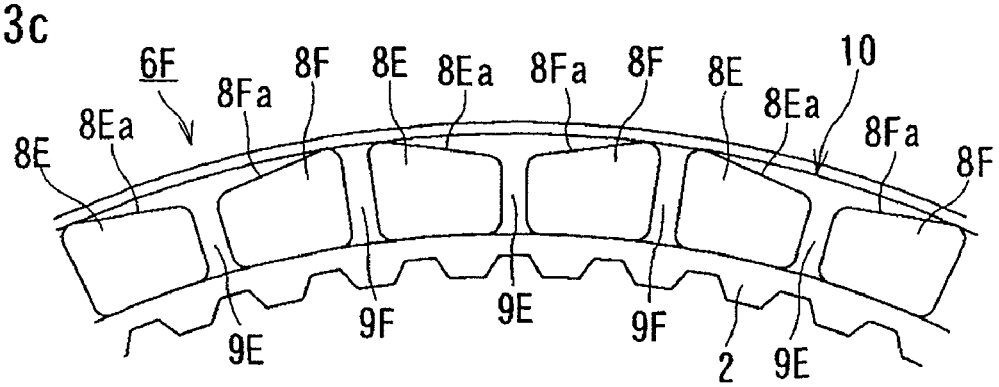

FIG. 13c is a plane view showing a part of a wet friction material according to a fifth modified example of the second embodiment of the invention.

Figure 14A:
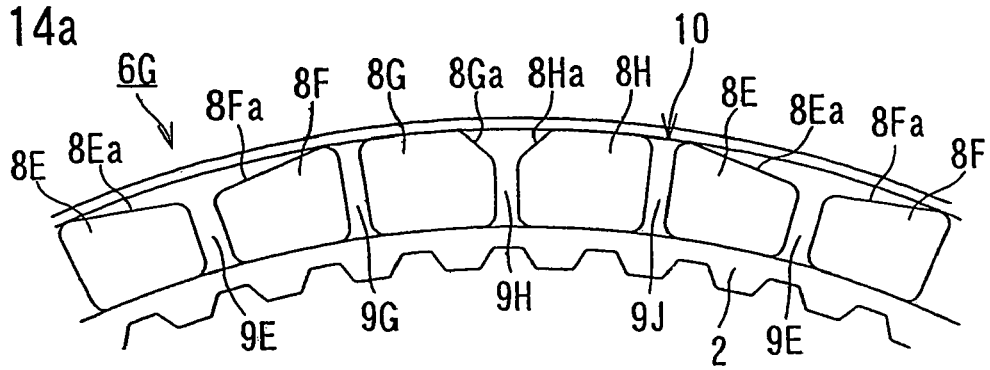

FIG. 14a is a plane view showing a part of a wet friction material according to a sixth modified example of the second embodiment of the invention.

Figure 14B:
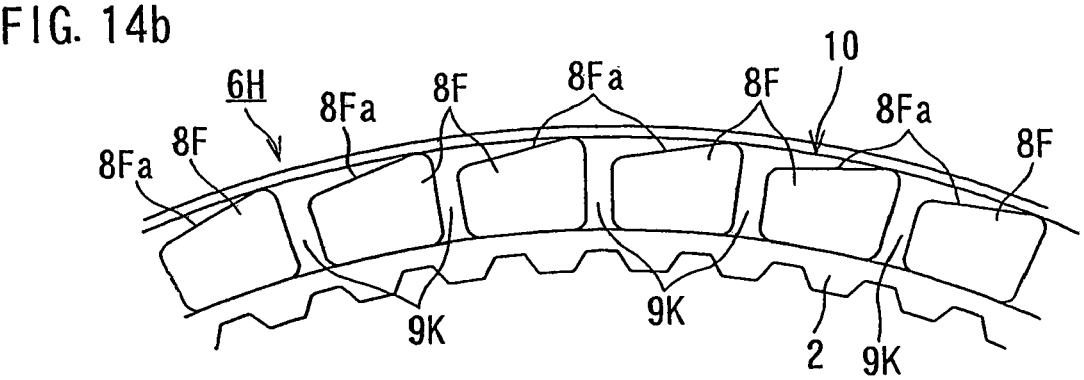

FIG. 14b is a plane view showing a part of a wet friction material according to a seventh modified example of the second embodiment of the invention.

Figure 14C:
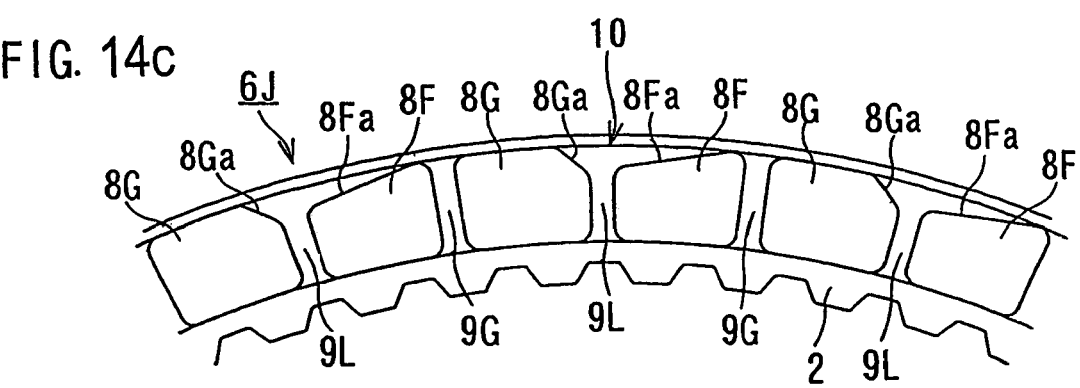

FIG. 14c is a plane view showing a part of a wet friction material according to an eighth modified example of the second embodiment of the invention.

DETAILED DESCRIPTION OF THE INVENTION

Preferred embodiments of the invention are described hereinafter referring to drawings. Besides, regarding points starting from a second embodiment, the same mark and the same sign as a first embodiment mean the same or equivalent function part to the first embodiment and the same mark and the same sign of the mutual embodiment is the common function part to those embodiments, therefore the overlapped detail explanation is to be omitted here.

First Embodiment

First, a wet friction material according to a first embodiment of the invention is described referring to FIG. 1 to FIG. 11.

Figure 1A:
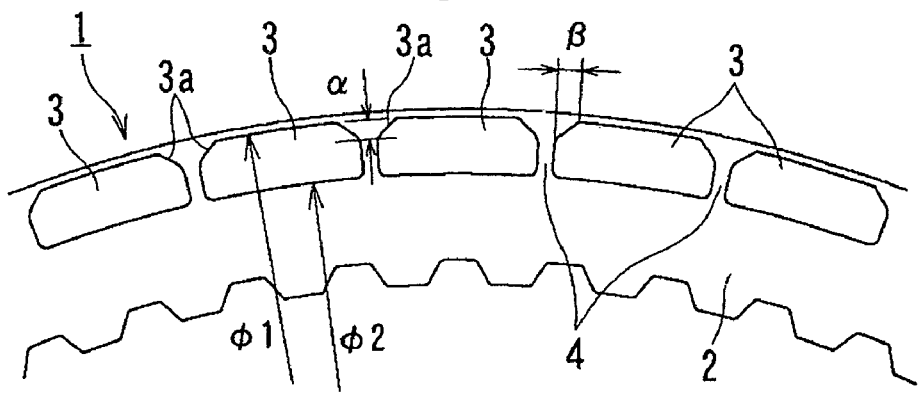
FIG. 1a is a plane view showing a part of a wet friction material (first example) according to a first embodiment of the invention.
Figure 1B:
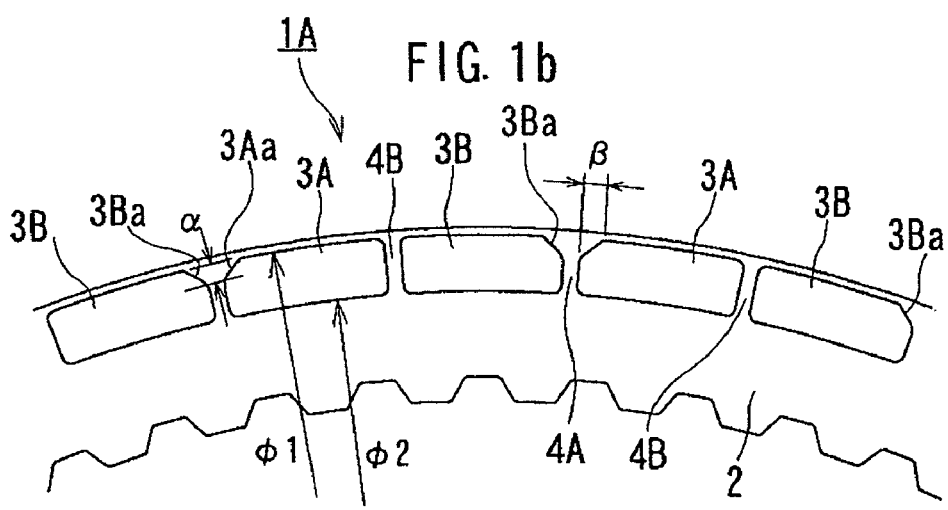
FIG. 1b is a plane view showing a part of a wet friction material (second example) according to a first modified example of the first embodiment of the invention.
Figure 1C:
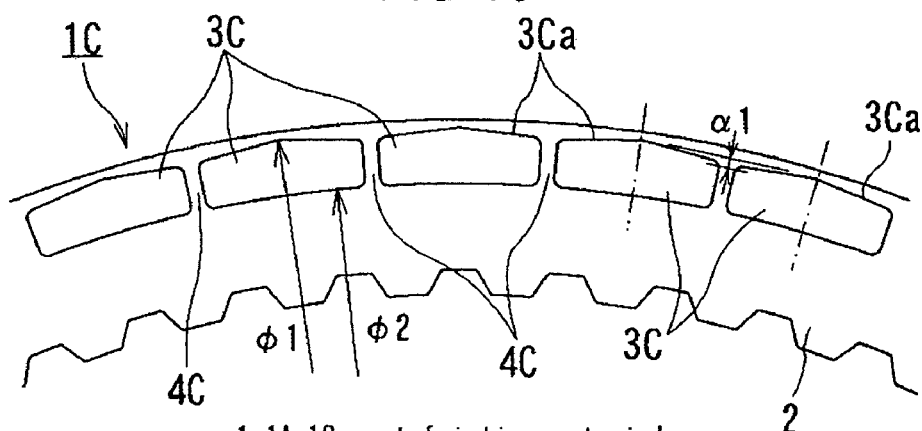
FIG. 1c is a plane view showing a part of a wet friction material (third example) according to a second modified example of the first embodiment of the invention.
Figure 2A:
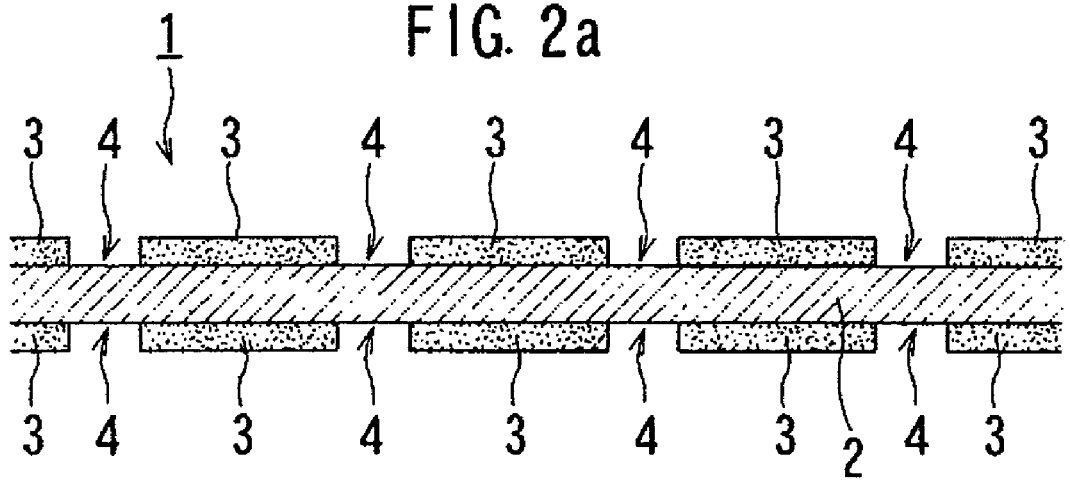
FIG. 2a is a partial sectional view showing a vertical section of the wet friction material according to the first embodiment of the invention.

FIG. 1a is a plane view showing a part of a wet friction material (first example) according to the first embodiment of the invention. FIG. 1b is a plane view showing a part of a wet friction material (second example) according to a first modified example of the first embodiment of the invention. FIG. 1c is a plane view showing a part of a wet friction material (third example) according to a second modified example of the first embodiment of the invention. FIG. 2a is a partial sectional view showing a vertical section of a wet friction material (first example) according to the first embodiment of the invention.

Figure 2B:
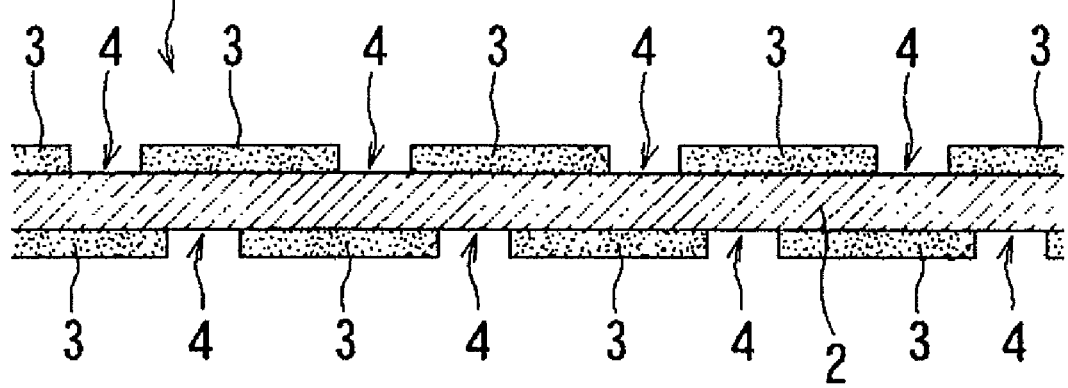
FIG. 2b is a partial sectional view showing a vertical section of a wet friction material according to a third modified example of the first embodiment of the invention.

FIG. 2b is a partial sectional view showing a vertical section of a wet friction material according to a third modified example of the first embodiment of the invention. FIG. 3a, 3b are plane views showing a part of a wet friction material according to other modified examples of the first embodiment of the invention. FIGS. 4a, 4b, 4c, 4d, 4e and 4f are plane views showing shapes of the segment pieces which are used for a wet friction material according to other modified examples of the first embodiment of the invention.

FIG. 5a is a plane view showing a part of a wet friction material according to a fourth modified example of the first embodiment of the invention. FIG. 5b is a plane view showing a part of a wet friction material according to a fifth modified example of the first embodiment of the invention. FIG. 5c is a plane view showing a part of a wet friction material according to a sixth modified example of the first embodiment of the invention. FIG. 5d is a plane view showing a part of a wet friction material according to a seventh modified example of the first embodiment of the invention. FIG. 5e is a plane view showing a part of a wet friction material according to an eighth modified example of the first embodiment of the invention.

FIG. 6a is a plane view showing a part of a wet friction material (first comparative example) according to the first example of a conventional art. FIG. 6b is a plane view showing a part of a wet friction material (second comparative example) according to the second example of the conventional art. FIG. 6c is a plane view showing a part of a wet friction material (third comparative example) according to the third example of the conventional art. FIG. 7 is a graph showing a relation between a relative number of rotations and a drag torque according to the first embodiment of the invention (the first to third examples), while compared to a conventional wet friction material (the first to third comparative examples). FIG. 8 is a view showing a relation of each parameter of the wet friction material (first example) according to the first embodiment of the invention.

FIG. 9 is a graph showing a relation between a drag torque reduction rate and a cut height (radial width) of an outer peripheral corner portion of an oil groove in the wet friction material (first example) of the first embodiment of the invention. FIG. 10 is a graph showing a relation between the drag torque reduction rate and a cut height (circumferential width) of the outer peripheral corner portion of the oil groove in the wet friction material (first example) of the first embodiment of the invention. FIG. 11a is an explanatory drawing showing a drag torque generation in the conventional wet friction material (first comparative example). FIG. 11b is an explanatory drawing showing the drag torque reduction effect of the wet friction material (first example) according to the first embodiment of the invention.

As shown in FIG. 1a, a segment-type friction material 1 as a wet friction material (first example) according to the first embodiment of the invention is made by that a plurality of segment pieces 3 that normal friction material substrates for a wet friction material use are cut off are arranged side-by-side on a front surface of a steel core metal 2 of a flat ring shape at an interval of an oil groove 4 and joined it with an adhesive (thermosetting resin) and similarly the other side of the core metal 2 is also joined with an adhesive. At this point, it is applied a cut 3a of a height (radical width of the segment-type friction material 1) α mm, a length (circumferential width of the segment-type friction material 1) β mm to right and left corner portions of the outer periphery of the segment piece 3 each.

That is, in the segment-type friction material 1 as a wet friction material (first example) according to the first embodiment of the invention, both the corner portions of the outer peripheral side of the segment piece 3 which is bounded by a plurality of the oil grooves 4 are made chamfering processing. All of the outer peripheral opening portions of the plurality of the oil grooves 4 are symmetrical shapes and it extends over four times as the width of the thinnest portion of the plurality of the oil grooves 4, while all of the plurality of the oil grooves 4 are symmetrical shapes. Therefore, the segment-type friction material 1 according to the first embodiment of the invention corresponds with a wet friction material according to claim 1 and claim 3 of the invention.

Also, as shown in FIG. 1b, a segment-type friction material 1A as a wet friction material (second example) according to the first modified example of the first embodiment of the invention is made by that a plurality of segment pieces 3A, 3B that normal friction material substrates for a wet friction material use are cut off are arranged side-by-side alternately on the front surface of the steel core metal 2 of the flat ring shape at intervals of oil grooves 4A, 4B and joined it with an adhesive (thermosetting resin) and similarly the other side of the core metal 2 is also joined with an adhesive. At this point, it is applied a cut 3Aa, 3Ba of a height (radical width of the segment-type friction material 1A) α mm, a length (circumferential width of the segment-type friction material 1A) β mm to the left corner portion of the outer periphery of the segment piece 3A and to the right corner portion of the outer periphery of the segment piece 3B each.

That is, in the segment-type friction material 1A as a wet friction material (second example) according to the first modified example of the first embodiment of the invention, one corner portion of the outer peripheral side of the segment pieces 3A, 3B which are bounded by the plurality of the oil grooves 4A, 4B is made chamfering processing. The oil groove 4A that the outer peripheral opening portion is a symmetrical shape and it extends over four times as the width of the thinnest portion of the plurality of the oil grooves 4A, 4B is applied to every one of the plurality of the oil grooves 4A, 4B, while all of the plurality of the oil grooves 4A, 4B are symmetrical shapes. Therefore, the segment-type friction material 1A according to the first modified example of the first embodiment of the invention corresponds with a wet friction material according to claim 1 and claim 2 of the invention.

Moreover, as shown in FIG. 1c, a segment-type friction material 1C as a wet friction material (third example) according to the second modified example of the first embodiment of the invention is made by that a plurality of segment pieces 3C that normal friction material substrates for a wet friction material use are cut off are arranged side-by-side on the front surface of the steel core metal 2 of the flat ring shape at an interval of an oil groove 4C and joined it with an adhesive (thermosetting resin) and similarly the other side of the core metal 2 is also joined with an adhesive. At this point, a cut 3Ca of a height (radical width of the segment-type friction material 1C) α1 mm and a length (circumferential width of the segment-type friction material 1C) 50% is applied to right and left corner portions of the outer periphery of the segment piece 3C. Briefly, the outer peripheral side of the segment piece 3C is cut down completely from both the sides, and al is equal to ¾α.

That is, in the segment-type friction material 1C as a wet friction material (third example) according to the second modified example of the first embodiment of the invention, both the corner portions of the outer peripheral of the segment piece 3C which is bounded by the plurality of the oil grooves 4C are made chamfering processing. All of the outer peripheral opening portions of the plurality of the oil grooves 4C are symmetrical shapes and it extends over four times as the width of the thinnest portion of the plurality of the oil grooves 4C, while all of the plurality of the oil grooves 4C are symmetrical shapes. Therefore, the segment-type friction material 1C according to the second modified example of the first embodiment of the invention corresponds with the wet friction material according to claim 1 and claim 3 of the invention.

A vertical sectional structure of the wet friction material (first example) according to the first embodiment and a vertical sectional structure of the wet friction material according to the third modified example of the first embodiment of the invention are described hereafter referring to FIG. 2. As shown in FIG. 2a, in the segment-type material 1 as a wet friction material (first example) according to the first embodiment of the invention, an adhesive joining position in a circumferential direction of the segment piece 3 approximately corresponds at the front surface and the rear surface of the core metal 2, therefore a position in a circumferential direction of the oil groove 4 almost corresponds at both sides also.

In contrast, as shown in FIG. 2b, in a segment-type friction material 1F as a wet friction material according to the third modified example of the first embodiment of the invention, the adhesive joining position in the circumferential direction of the segment piece 3 is shifted at the front surface and the rear surface of the core metal 2, therefore the position in the circumferential direction of the oil groove 4 is shifted at both sides also.

That is, the adhesive joining position of the segment piece 3 and the position of the oil groove 4 in the circumferential direction can be arranged random at both sides of the core metal 2. It would be fine if these positions correspond in both sides of the core metal 2 as the segment-type friction material 1 shown in FIG. 2a, also it would be fine if these positions are shifted in both sides of the core metal 2 as the segment-type friction material 1F shown in FIG. 2b. This is all the same in other segment-type friction materials described in the first embodiment of the invention.

Next, a wet friction material according to other modified examples of the first embodiment of the invention is described referring to FIG. 3.

As shown in FIG. 3a, a segment-type friction material 1D as a wet friction material according to other modified examples of the first embodiment of the invention is made by that a plurality of segment pieces 3, 3A, 3B that normal friction material substrates for a wet friction material use are cut off are arranged side-by-side on the front surface of the steel core metal 2 of the flat ring shape at an interval of an oil groove and joined it with an adhesive (thermosetting resin) and similarly the other side of the core metal 2 is also joined with an adhesive.

At this point, in FIG. 3a, 3b, both of the oil groove which is applied in between the segment piece 3 and the segment piece 3A and the oil groove which is applied in between the segment piece 3 and the segment piece 3B (both of the outer peripheral opening portions are symmetrical shapes and it extends over four times of the width of the thinnest portion of a plurality of oil grooves) are made to be an oil groove 4D.

As shown in FIG. 3a, in the segment-type friction material 1D, segment pieces 3A, 3B are joined two by two with an adhesive alternately after joining two pieces of the segment piece 3 with an adhesive. This is repeated over the whole circumference. As a result, oil grooves 4D, 4 and 4D that outer peripheral opening portions are symmetrical shapes and it extends over four times as the width of the thinnest portion of a plurality of oil grooves is successively arranged side-by-side, and next, one oil groove 4B that the outer peripheral opening portion does not extend is placed, and then the oil groove 4A that the outer peripheral opening portion extends is placed. Moreover, one oil groove 4B that the outer peripheral opening portion does not extend is placed again and similarly the oil grooves 4D, 4 and 4D that the outer peripheral opening portion extends is successively arranged side-by-side subsequently.

Also, as shown in FIG. 3b, a segment-type friction material 1E as a wet friction material according to other modified examples of the first embodiment of the invention is made by that a plurality of segment pieces 3, 3A and 3B that normal friction material substrates for a wet friction material use are cut off are arranged side-by-side on the front surface of the steel core metal 2 of the flat ring shape at an interval of an oil groove and joined it with an adhesive (thermosetting resin) and similarly the other side of the core metal 2 is also joined with an adhesive.

As shown in FIG. 3b, in the segment-type friction material 1E, segment pieces 3, 3A and 3B are joined in the right-handed direction (clockwise) in turn with an adhesive and this is repeated over the whole circumference. As a result, the oil groove 4D that the outer peripheral opening portion is a symmetrical shape and it extends over four times as the width of the thinnest portion of the plurality of the oil grooves is arranged two in a row side-by-side, and next, one oil groove 4B that the outer peripheral opening portion does not extend is placed, then again the oil groove 4D that the outer peripheral opening portion extends is arranged two in a row side-by-side.

That is, "at least every two of a plurality of oil grooves" described in the second aspect of the invention means that the oil groove that the outer peripheral opening portion extends over four times as the width of the thinnest portion of the oil grooves is applied at least every two of the oil grooves, and there is a possibility that an oil groove that the outer peripheral opening portion does not extend or the oil groove that the outer peripheral opening portion extends is applied over two in a row side-by-side.

Therefore, the segment-type friction material 1D, 1E as a wet friction material according to other modified examples of the first embodiment corresponds with the wet friction material according to an invention of claim 1 and claim 2.

Moreover, a shape of segment pieces used as a wet friction material according to other modified examples of the first embodiment of the invention is described referring to FIG. 4.

Figure 4A:
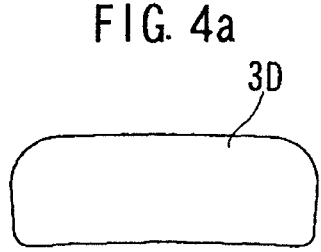
Figure 4B:
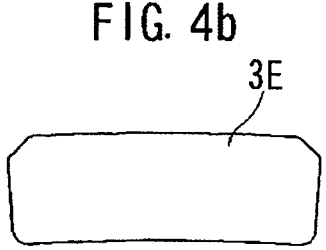
Figure 4C:
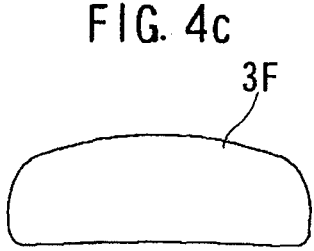

In a segment piece 3D shown in FIG. 4a, both of outer peripheral corner portions are made R processing. In a segment piece 3E shown in FIG. 4b, both of outer peripheral corner portions are made chamfering processing so as to be smaller than the segment piece 3 shown in FIG. 1a. In a segment piece 3F shown in FIG. 4c, both of outer peripheral corner portions are made R processing to the middle part of the outer periphery.

Thus, the segment-type friction material as a wet friction material according to other modified examples of the first embodiment of the invention, which is formed by using segment pieces 3D, 3E and 3F each, corresponds with the wet friction material according to an invention of claim 1 and claim 3.

Figure 4D:
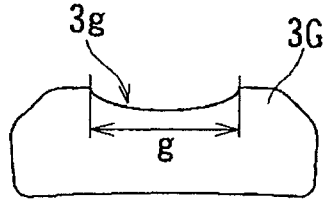
Figure 4E:
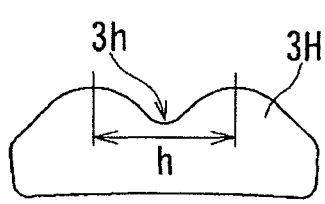
Figure 4F:
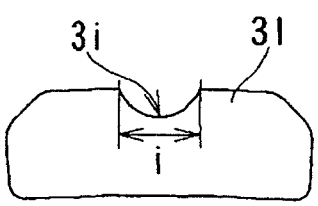

Additionally, in a segment piece 3G shown in FIG. 4d, both of outer peripheral corner portions are made chamfering processing and a dent 3g in the outer peripheral side of a width g mm is applied to the center portion of the outer peripheral side. In a segment piece 3H shown in FIG. 4e, both of outer peripheral corner portions are made R processing and a dent 3g in the outer peripheral side of a width h mm is applied to the center portion of the outer peripheral side. In a segment piece 3I shown in FIG. 4f, both of outer peripheral corner portions are made chamfering processing and a dent 3i in the outer periphery side of a width i mm is applied to the center portion of the outer peripheral side.

Therefore, the segment-type friction material as a wet friction material according to other modified examples of the first embodiment of the invention, which is formed by using segment pieces 3G, 3H and 3I each, corresponds with a wet friction material according to an invention of claim 1, claim 3 and claim 5.

Accordingly, in the segment-type friction material which is formed by using segment pieces 3G, 3H and 3I each, it can certainly obtain a more significant drag torque reduction effect because the lubricating oil which is supplied from the outer peripheral side runs over to front surfaces of the segment pieces 3G, 3H, and 3I not only from the portion of R processing or chamfering processing but also from the dents 3g, 3h and 3i. Also, this segment-type friction material can certainly prevent the drag torque from increasing by generating oil retained at the outer periphery because the space for the lubricating oil of the outer peripheral side of the wet friction material to flow extends more.

Moreover, the wet friction material according to other modified examples of the first embodiment of the invention is described referring to FIG. 5.

As shown in FIG. 5a, a segment-type friction material 1G as a wet friction material according to the fourth modified example of the first embodiment of the invention is made by that a plurality of segment pieces 3J that normal friction material substrates for a wet friction material use are cut off are arranged side-by-side on the front surface of the steel core metal 2 of the flat ring shape at an interval of an oil groove 4E and joined it with an adhesive (thermosetting resin) and similarly the other side of the core metal 2 is also joined with an adhesive. In addition, the segment piece 3J is larger than the above segment piece 3 etc. in the height (radial width) and the length (circumferential width) also. Therefore, the number of the oil grooves 4E is thirty at the whole circumference, which is less than the above segment-type friction material 1 etc.

At this point, it is applied a cut (chamfering processing) 3Ja to right and left outer peripheral corner portions of the segment piece 3J and applied a dent 3j in the outer peripheral side of a width j mm to the outer peripheral center portion of the segment piece 3J. Therefore, the segment-type friction material 1G as a wet friction material according to the fourth modified example of the first embodiment of the invention, which is formed by using the segment piece 3J, corresponds with the wet friction material according to an invention of claim 1, claim 3 and claim 5.

Accordingly, in the segment-type friction material 1G, it can certainly obtain a more significant drag torque reduction effect because the lubricating oil which is supplied from the outer peripheral side runs over to the front surface of the segment piece 3J not only from the chamfering processing portion 3Ja but also from the dent 3j. Also, it can prevent the drag torque from increasing by generating oil retained at the outer periphery more certainly since the space for the lubricating oil of the outer periphery of the segment-type friction material 1G to flow extends more.

Additionally, as shown in FIG. 5b, a segment-type friction material 1H as a wet friction material according to the fifth modified example of the first embodiment of the invention is made by that a plurality of segment pieces 3K, 3L that normal friction material substrates for a wet friction material use are cut off are arranged side-by-side alternately on the front surface of the steel core metal 2 of the flat ring shape at intervals of oil grooves 4F, 4G and joined it with an adhesive (thermosetting resin), and similarly the other side of the core metal 2 is also joined with an adhesive. Also, the segment pieces 3K, 3L are larger than the above segment piece 3 etc. in the height (radial width) but the length (circumferential width) is in the same range, therefore the number of the oil grooves 4F, 4G is forty at the whole circumference, which is same as the above segment-type friction material 1 etc.

At this point, in the right outer peripheral corner portion of the segment piece 3K, it is applied chamfering processing 3Ka almost allover the outer peripheral side of the segment piece 3K. In the left outer peripheral corner portion of the segment piece 3L, it is applied chamfering processing 3La almost allover the outer peripheral side of the segment piece 3L. Therefore, the segment-type friction material 1H as a wet friction material according to the fifth modified example of the first embodiment of the invention, which is made by using segment pieces 3K, 3L, corresponds with the wet friction material according to an invention of claim 1 and claim 2.

Also, as shown in FIG. 5c, a segment-type friction material 1J as a wet friction material according to the sixth modified example of the first embodiment of the invention is made by that a plurality of segment pieces 3K, 3L, 3M and 3N that normal friction material substrates for a wet friction material use are cut off are arranged side-by-side in the right-handed direction (clockwise) in this order on the front surface of the steel core metal 2 of the flat ring shape at intervals of oil grooves 4F, 4G, 4H, 4J and 4K and joined it with an adhesive (thermosetting resin), and similarly the other side of the core metal 2 is also joined with an adhesive.

At this point, it is applied a cut (chamfering processing) 3Ma to the right outer peripheral corner portion of the segment piece 3M and applied a cut (chamfering processing) 3Na to the left outer peripheral corner portion of the segment piece 3N. Therefore, the segment-type friction material 1J as a wet friction material according to the sixth modified example of the first embodiment of the invention, which is made by using segment pieces 3K, 3L, 3M and 3N, corresponds with the wet friction material according to an invention of claim 1 and claim 2.

In addition, as shown in FIG. 5d, a segment-type friction material 1K as a wet friction material according to the seventh modified example of the first embodiment of the invention is made by that a plurality of segment pieces 3K that normal friction material substrates for a wet friction material use are cut off are arranged side-by-side on the front surface of the steel core metal 2 of the flat ring shape at an interval of an oil groove 4L and joined it with an adhesive (thermosetting resin), and similarly the other side of the core metal 2 is also joined with an adhesive. Therefore, the segment-type friction material 1K as a wet friction material according to the seventh modified example of the first embodiment of the invention, which is made by using the segment piece 3K, corresponds with the wet friction material according to an invention of claim 1.

Moreover, as shown in FIG. 5e, a segment-type friction material 1L as a wet friction material according to the eighth modified example of the first embodiment of the invention is made by that a plurality of segment pieces 3L, 3M that normal friction material substrates for a wet friction material use are cut off are arranged side-by-side alternately on the front surface of the steel core metal 2 of the flat ring shape at intervals of oil grooves 4H, 4M and joined it with an adhesive (thermosetting resin), and similarly the other side of the core metal 2 is also joined with an adhesive. Therefore, the segment-type friction material 1L as a wet friction material according to the eighth modified example of the first embodiment of the invention, which is made by using segment pieces 3L, 3M corresponds with the wet friction material according to an invention of claim 1.

Accordingly, in the segment-type friction materials 1H, 1J, 1K and 1L, it can certainly obtain a more significant drag torque reduction effect because the lubricating oil which is supplied from the outer peripheral side runs over to front surfaces of segment pieces 3K, 3L, 3M and 3N from the chamfering processing portion. Also, it can prevent the drag torque from increasing by generating oil retained at the outer periphery since the space for the lubricating oil of the outer periphery of the wet friction material to flow extends more.

Next, a segment-type friction material as a wet friction material according to the conventional art is described referring to FIG. 6.

As shown in FIG. 6a, a segment-type friction material 11 as a wet friction material (first comparative example) according to the first example of the conventional art is made by that a plurality of segment pieces 13 that normal friction material substrates for a wet friction material use are cut off are arranged side-by-side on the front surface of the steel core metal 2 of the flat ring shape at an interval of an oil groove 14 and joined it with an adhesive (thermosetting resin), and similarly the other side of the core metal 2 is also joined with an adhesive. The segment-type friction material 11 according to the first example of the conventional art having such a composition corresponds with an example of the segment-type friction material according to an invention described in the above patent publication 4.

Also, as shown in FIG. 6b, a segment-type friction material 11A as a wet friction material (second comparative example) according to the second example of the conventional art is made by that a plurality of segment pieces 13A, 13B that normal friction material substrates for a wet friction material use are cut off are arranged side-by-side alternately on the front surface of the steel core metal 2 of the flat ring shape at intervals of oil grooves 14A,14B and joined it with an adhesive (thermosetting resin), and similarly the other side of the core metal 2 is also joined with an adhesive At this point, a cut 13Aa, 13Ba of the height (radial width of the segment-type friction material 11A) α mm and the length (circumferential width of the segment-type friction material 11A) β mm is applied to the left inner peripheral corner portion of the segment piece 13A and to the right inner peripheral corner portion of the segment piece 13B each. The segment-type friction material 11A according to the second example of the conventional art having such a composition corresponds with an example of the segment-type friction material according to an invention described in the above patent publication 3.

Moreover, as shown in FIG. 6c, a segment-type friction material 11C as a wet friction material (third comparative example) according to the third example of the conventional art is made by that a plurality of segment pieces 13C that normal friction material substrates for a wet friction material use are cut off are arranged side-by-side on the front surface of the steel core metal 2 of the flat ring shape at an interval of an oil groove 14C and joined it with an adhesive (thermosetting resin), and similarly the other side of the core metal 2 is also joined with an adhesive. The segment-type friction material 11C according to the third example of the conventional art having such a composition corresponds with an example of the segment-type friction material according to an invention described in the above patent publication 2.

In the segment-type friction materials according to the first embodiment of the invention described above, it examined a relation between a relative number of rotations and a drag torque in the segment-type friction material 1 (first example), the segment-type friction material 1A (second example) according to the first modified example, the segment-type friction material 1C (third example) according to the second modified example, the segment-type friction material 11 (first comparative example) according to the first example of the conventional art, the segment-type friction material 11A (second comparative example) according to the second example of the conventional art and the segment-type friction material 11C (third comparative example) according to the second example of the conventional art.

A size of each segment piece is to be as follows. A horizontal width of the segment piece is 13 mm, a vertical width of the segment piece 3 is 5 mm, the number of the segment pieces is forty (eighty on both the sides), a width of the thinnest portion of oil grooves is 1 mm, and α, β is 2 mm each. That is, in the segment piece 3, the circumferential width of chamfering processing (2 mm) is 15.4% of that of the segment piece 3 (13 mm). The radial width of the chamfering processing (2 mm) is 40% of that of the segment piece (5 mm). This is the same in the segment piece 3A, 3B as well.

Moreover, in the segment piece 3C, the circumferential width of chamfering processing (6.5 mm) is 50% of that of the segment piece 3 (13 mm). The radial width of the chamfering processing ($\alpha 1 = 3/4$, that is, $\alpha = 3/4 \times 2$ mm=1.5 mm) is 30% of that of the segment piece (5 mm). Therefore, the segment-type friction materials 1, 1A and 1C as a wet friction material according to the first embodiment of the invention also correspond with the wet friction material according to an invention of claim 4.

Test condition is as follows. A relative number of rotations is 500 to 7000 rpm, an oil temperature of ATF is 40 degrees, an oil amount of ATF is 500 ml/min (without shaft core lubrication), and an outer periphery Ø1 is 185 mm, an inner periphery Ø2 is 175 mm in a disc size shown in FIG. 1 and FIG. 3. The number of the disc plates is seven and the number of a counterpart steel disc plates is eight accordingly and a back clearance is 0.25 mm per plate. Test results are shown referring to FIG. 7.

As shown in FIG. 7, at a point that the relative number of rotations is 500 rpm, there has already a big difference between the first to third examples and the first and second comparative examples. The drag torque of the segment-type friction materials 1, 1A and 1C according to the first embodiment of the invention (the first to third examples) becomes low, while compared to that of the segment-type friction materials 11, 11A and 11C according to the first to third comparative examples.

Afterwards, as the relative number of rotations goes up, the drag torque gets lower in every segment-type friction materials because of the condition, without axis core lubrication. However, at the point that the relative number of rotations is 1000 rpm, 1500 rpm and 200 rpm, the difference between the first to third examples and the first to third comparative examples is kept. And at the point that the relative number of rotations is 2500 rpm, there is almost no difference between the first to third examples and the first and third comparative examples, but only in the second comparative example, the drag torque is still high. Up to 7000 rpm, the drag torque of the second comparative example is higher than that of the first to third examples.

As described above, it is proved that the segment-type friction materials 1, 1A, and 1C according to the first embodiment (the first to third examples) of the invention have a significant drag torque reduction effect, while compared to that of segment-type friction materials 11, 11A, and 11C (the first to third comparative examples) according to the conventional art.

Moreover, as shown in FIG. 7, throughout all of the examined range of the relative number of rotations of 500 rpm to 7000 rpm, the drag torque in the segment-type friction material 1C according to the third example is low, while compared to that of the segment-type friction material 1, 1A according to the first and second examples. Therefore, it found that even in the segment-type friction materials 1, 1A and 1C according to the first embodiment of the invention, the segment-type friction material 1C, that is, the segment-type friction material which is made chamfering processing symmetrically up to the center portion of the outer peripheral side of the segment piece has a more significant drag torque reduction effect.

Thus, to obtain a larger drag torque reduction effect, it examined to seek an optimal value about six parameters related to the segment-type friction material 1 according to the first embodiment of the invention shown in FIG. 8 and to the segment piece 3 which is used for the segment-type friction material 1 each. The six parameters are as follows. A height a of the cut 3a (radial width), a length β of the cut 3a (circumferential width), a width γ of the thinnest portion of oil grooves 4, a horizontal width δ of the segment piece 3, a vertical width ε of the segment piece 3, and a width σ of the outer peripheral opening portion of the oil groove 4.

Of these, bar graphs of FIG. 9, FIG. 10 show an experimental result on the height α and the length β of cut 3a each. First, to seek an optimal value of the height a of the cut 3a, the length β of the cut 3a is fixed as 2.0 mm. Then, it makes a sample changed the cut height α in four different ways and assembled it into an actual equipment of AT so as to measure a drag torque reduction rate.

Moreover, the drag toque reduction rate is shown as an average value of the following two measured values when the rotating speed of the segment-type friction material 1 is 1000 rpm and 1500 rpm. And in case of the cut height α 2.0 mm and the cut length β 2.0 mm, that is, on the basis of a case of the first example shown in FIG. 5, it shows a positive when the drag torque reduction rate increasers and shows a negative when the drag torque reduction rate decreases, while compared to the first example.

Furthermore, other parameters showed in FIG. 8 are set as follows. A width γ of the thinnest portion of oil grooves 4 is 1 mm, a horizontal width δ of the segment piece 3 is 13 mm and a vertical width ε of the segment piece 3 is 5 mm. Test conditions are as follows. An oil temperature of ATF is 40 degrees, an oil amount of ATF is 500 ml/min (without shaft core lubrication), an outer periphery Ø1 is 185 mm and an inner periphery Ø2 is 175 mm in the disc size. The number of the disc plates is seven (thus, the number of a counterpart steel disc plates is eight) and a back clearance is 0.25 mm per plate.

As a result, as shown in FIG. 9, the drag torque reduction rate gets lower having a negative value when the cut height α is small as 1.0 mm or 1.5 mm, while compared to the first example. In contrast, the drag torque reduction rate gets higher having a positive value when the cut height α is high as 2.5 mm, while compared to the first example. This result can be considered that the drag torque reduction rate is improved as the cut height α is getting high.

Meanwhile, to seek an optimal value of the length β of the cut 3a, the cut height α is fixed as 2.0 mm, then it makes a sample changed the cut length β in four different ways and assembled it into the actual equipment of AT so as to measure a drag torque reduction rate in the same test condition. As a result, as shown in FIG. 10, the drag torque reduction rate gets lower becoming a negative value when the cut height β is low as 1.0 mm or 1.5 mm, while compared to the first example. On the other hand, the drag torque reduction rate becomes a positive value when the cut height β is high as 2.5 mm, while compared to the first example. As a result, it can be considered that the drag torque reduction rate is improved as the cut height β is becoming high.

Moreover, as a result of making repeated experiments even in a relation between ones of the other parameters shown in FIG. 8, it shows it can obtain a more significant drag torque reduction rate when meeting the following requirements. The cut height α is within a range of 25% to 50% of the vertical width ε of the segment piece 3, the cut length β is less than or equal to 0.5 times the horizontal width δ of the segment piece 3 and the width σ of the outer peripheral opening portion of the oil groove 4 is equal to or more than four times of the width γ of the thinnest portion of the oil grooves 4.

As described above, in case of the specification that there is no lubricating oil (ATF) supply from the inner peripheral side of the wet friction material, that is, when there is the lubricating oil supply only from the outer peripheral side of the wet friction material, ATF flows into the front surface of the segment piece from the processing portion by that one or both of outer peripheral corner portions of the segment piece is made R processing or chamfering processing in case of segment-type friction materials and it can obtain a significant drag torque reduction effect by a peeling effect that goes into a counterpart material.

In contrast, a case that there is lubricating oil (ATF) supply from the inner peripheral side of the wet friction material is described referring to FIG. 11. As shown in FIG. 11a, in the segment-type friction material 11 as a wet friction material (first comparative example) according to the first example of the conventional art, a stirred torque resulting from ATF which is retained at the outer peripheral side is high, therefore the drag torque increases.

At the same time, as shown in FIG. 11b, in the segment-type friction material 1 as a wet friction material (first example) according to the first embodiment of the invention, it can restrain the stirred torque resulting from ATF by applying the cut 3a to the outer periphery of the segment piece 3. Also, it can reduce the drag torque by a peeling effect that ATF flows into the front surface of the segment piece 3 from the cut 3a and it goes into the counterpart material.

Additionally, as described above, when there is the lubricating oil supply only from the outer peripheral side, the drag torque reduction effect is low even if it makes a cut into the inner periphery of the segment piece. However, when there is the lubricating oil (ATF) supply from the inner peripheral side, it can obtain a more significant drag torque reduction effect by making a cut not only into the outer periphery of the segment piece but also into the inner periphery of the segment piece.

Accordingly, in the segment-type friction materials 1, 1A, and 1C as a wet friction material according to the first embodiment of the invention, it can obtain a more significant drag torque reduction effect more certainly even in case of the specification (without axis core lubrication) that there is no lubricating oil supply from the inner periphery or in case that the stirred torque increases by generating oil retained at the outer periphery also.

Second Embodiment

Next, a wet friction material according to a second embodiment of the invention is described referring to FIG. 12 to FIG. 14.

FIG. 12a is a plane view showing a part of a wet friction material according to the second embodiment of the invention. FIG. 12b is a partial sectional view showing a vertical section of the wet friction material according to the second embodiment of the invention. FIG. 12c is a plane view showing a part of a wet friction material according to a first modified example of the second embodiment of the invention. FIG. 12d is a plane view showing a part of a wet friction material according to a second modified example of the second embodiment of the invention.

FIG. 13a is a partial sectional view showing a vertical section of a wet friction material according to a third modified example of the second embodiment of the invention. FIG. 13b is a plane view showing a part of a wet friction material according to a fourth modified example of the second embodiment of the invention. FIG. 13c is a plane view showing a part of a wet friction material according to a fifth modified example of the second embodiment of the invention. FIG. 14a is a plane view showing a part of a wet friction material according to a sixth modified example of the second embodiment of the invention. FIG. 14b is a plane view showing a part of a wet friction material according to a seventh modified example of the second embodiment of the invention. FIG. 14c is a plane view showing a part of a wet friction material according to an eighth embodiment of the second embodiment of the invention.

As shown in FIG. 12a, 12b, a wet friction material 6 according to the second embodiment of the invention differs from the segment-type friction material of the first embodiment and there is provided a ring-type friction material made by pressing both of surfaces of ring-shaped friction material substrates 7 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9 (forty on one side) placing an island shaped portion 8 in between.

At this point, the oil groove 9 is one that the outer peripheral opening portion extends to the symmetrical shape and both of outer peripheral corner portions of the island shaped portion 8 which is bounded by ones of the plurality of the oil grooves 9 are made chamfering processing (8a). All of outer peripheral opening portions of the plurality of the oil grooves 9 are symmetrical shapes and it extends over four times as the width of the thinnest portion of the plurality of the oil grooves 9, while all of the plurality of the oil grooves 9 are symmetrical shapes. Therefore, the ring-type friction material 6 according to the second embodiment of the invention corresponds with the wet friction material according to an invention of claim 1 and claim 3.

Additionally, the same measurement as α, β in the segment-type friction material 1 according to the above first embodiment is used to a radial height X (mm) and a circumferential length Y (mm) of the chamfering processing portion 8a of the island shaped portion 8 of the friction material substrate in the outer peripheral opening portion of the oil grooves 9 that the outer peripheral portion extends to the symmetrical shape. That is, X is 2 mm and Y is 2 mm.

Moreover, even in a horizontal width and a vertical width of the island shaped portion 8, the same measurement as the segment piece 3 in the segment-type friction material 1 according to the above first embodiment is used. That is, the horizontal width of the island shaped portion 8 is 13 mm and the vertical width of the island shaped portion 8 is 5 mm. Therefore, the ring-type friction material 6 as a wet friction material according to the second embodiment of the invention also corresponds with the wet friction material according to an invention of claim 4.

Furthermore, as shown in FIG. 12c, in a wet friction material 6A according to the first modified example of the second embodiment of the invention, there is provided a ring-type friction material made by pressing both surfaces of ring-shaped friction material substrates 7 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9A, 9B (forty on one side) placing an island shaped portion 8A, 8B in between. Here, it is applied chamfering processing 8Aa, 8Ba of a height (radical width) X mm and a length (circumferential width) Y mm to the left outer peripheral corner portion of the island shaped portion 8A and to the right outer peripheral corner portion of the island shaped portion 8B each.

That is, in the ring-type friction material 6A as a wet friction material according to the first modified example of the second embodiment of the invention, one of outer peripheral corner portions of island shaped portions 8A, 8B which are bounded by a plurality of oil grooves 9A, 9B is made chamfering processing. It is applied the oil groove 9A that the outer peripheral opening portion is the symmetrical shape and it extends over four times as the width of the thinnest portion of the plurality of the oil grooves 9A, 9B to every one of the plurality of the oil grooves 9A, 9B, while all of the plurality of the oil grooves 9A, 9B are symmetrical shapes. Therefore, the ring-type friction material 6A according to the first modified example of the second embodiment of the invention corresponds with the wet friction material according to an invention of claim 1 and claim 2.

Moreover, even in a horizontal width and a vertical width of the island shaped portions 8A, 8B, the same measurement as the segment piece 3 in the segment-type friction material 1 according to the above first embodiment of the invention is used. That is, the horizontal width of the island shaped portions 8A, 8B is 13 mm and the vertical width of the island shaped portions 8A, 8B is 5 mm. Therefore, the ring-type friction material 6A as a wet friction material according to the first modified example of the second embodiment of the invention also corresponds with the wet friction material according to an invention of claim 4.

Furthermore, as shown in FIG. 12d, in a wet friction material 6C according to the second modified example of the second embodiment of the invention, there is provided a ring-type friction material made by pressing both surfaces of ring-shaped friction material substrates 7 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9C (forty on one side) placing an island shaped portion 8C in between. Here, it is applied chamfering processing 8Ca to right and left outer peripheral corner portions of the island shaped portion 8C so as to be the height (radical width) X1 mm and the length (circumferential width) 50%. That is, the outer peripheral side of the island shaped portion 8C is completely cut off from either side and X1 is equal to ¾X.

More specifically, in the ring-type friction material 6C as a wet friction material according to the second modified example of the second embodiment of the invention, both of outer peripheral corner portions of the island shaped portion 8C which is bounded by a plurality of oil grooves 9C are made chamfering processing. All of the outer peripheral opening portions are symmetrical shapes and it extends over four times as the width of the thinnest portion of the plurality of the oil grooves 9C, while all of the plurality of the oil grooves 9C are symmetrical shapes. Therefore, the ring-type friction material 6C according to the second modified example of the second embodiment of the invention corresponds with the wet friction material according to an invention of claim 1 and claim 3.

Additionally, even in a horizontal width and a vertical width of the island shaped portion 8C, same measurement as the segment piece 3 in the segment-type friction material 1 according to the above first embodiment is used. That is, the horizontal width of the island shaped portion 8C is 13 mm and the vertical width of the island shaped portion 8C is 5 mm. Therefore, the ring-type friction material 6C as a wet friction material according to the second modified example of the second embodiment of the invention also corresponds with the wet friction material according to an invention of claim 4.

Next, a ring-type friction material as a wet friction material according to the third to fifth modified examples of the second embodiment of the invention is described referring to FIG. 13. As shown in FIG. 13a, a wet friction material 6D according to the third modified example of the second embodiment of the invention differs from the segment-type friction material of the first embodiment. And there is provided a ring-type friction material made by pressing both surfaces of ring-shaped friction material substrates 7 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9 (forty on one side) placing an island shaped portion 8 in between.

At this point, the difference between the ring-type friction material 6D according to the third modified example of the second embodiment of the invention and the ring-type friction material 6 according to the second embodiment of the invention shown in FIG. 12a, 12b is as follows. In the ring-type friction material 6D, a portion of the island shaped portion 8 formed in the circumferential direction correspond approximately in both sides of the core metal 2, therefore a position of the oil groove 9 in the circumferential direction is also corresponds approximately in both the sides. On the other hand, in the ring-type friction material 6D, the position of the island shaped portion 8 formed in the circumferential direction is out of alignment in both surfaces of the core metal 2, therefore the portion of the oil groove 9 in the circumferential direction is also out of alignment in both the sides.

That is, the position of the island shaped portion 8 formed in the circumferential direction and the position of the oil groove 9 in the circumferential direction can be arranged random at both surfaces of the core metal 2. It would be fine if these positions correspond to both surfaces of the core metal 2 as the ring-type friction material 6 shown in FIG. 12a, 12b. Also, it would be fine if these positions are out of alignment in both surfaces of the core metal 2 as the ring-type friction material 6D shown in FIG. 13a. This is all the same in other ring-type friction materials described in the second embodiment of the invention as well.

Next, as shown in FIG. 13b, a ring-type friction material 6E according to the fourth modified example of the second embodiment of the invention has a reverse outer peripheral shape against the island shaped portion 8C of the ring-type friction material 6C according to the second modified example of the second embodiment of the invention shown in FIG. 12d. That is, an island shaped portion 8D of the ring-type friction material 6E has a dent 8d in the outer peripheral side of a width d mm, while the island shaped portion 8C of the ring-type friction material 6C has a convex shape in the outer peripheral side. Moreover, it is applied chamfering processing 8Da in right and left outer peripheral corner portions of the island shaped portion 8D.

In addition, the island shaped portion 8D is larger than the above island shaped portion 8 etc. in the height (radial width) and the length (circumferential width) also. For this reason, the number of oil grooves 9D is thirty at the whole circumference, which is less than the above ring-type friction material 6 etc. All of the outer peripheral opening portions of a plurality of oil grooves 9D are symmetrical shapes and it extends over four times as the width of the thinnest portion of the plurality of the oil grooves 9D, while all of the plurality of the oil grooves 9D are symmetrical shapes. Therefore, the ring-type friction material 6E according to the fourth modified example of the second embodiment of the invention corresponds with the wet friction material according to an invention of claim 1, claim 3 and claim 5.

Moreover, as shown in FIG. 13c, a ring-type friction material 6F as a wet friction material according to the fifth modified example of the second embodiment of the invention is made by pressing both surfaces of ring-shaped friction material substrates 10 that normal friction material substrates for a wet friction material use are cut off, which are joined onto the surface of the steel core metal 2 of the flat ring shape thereof with an adhesive (thermosetting resin), so as to form a plurality of oil grooves 9E, 9F (forty on one side) placing island shaped portions 8E, 8F in between. Also, the island shaped portions 8E, 8F are larger than the above the island shaped portion 8 etc. in the height (radial width), and however the length (circumferential width) is in the same range. Therefore, the number of the oil grooves 9E, 9F is forty each at the whole circumference, which is same as the above ring-type friction material 6 etc.

At this point, in the right outer peripheral corner portion of the island shaped portion 8E, it is applied chamfering processing 8Ea almost allover the outer peripheral side of the island shaped portion 8E. Also, in the left outer peripheral corner portion of the island shaped portion 8F, it is applied chamfering processing 8Fa almost allover the outer peripheral side of the island shaped portion 8F. Therefore, the ring-type friction material 6F as a wet friction material according to the fifth modified example of the second embodiment of the invention corresponds with the wet friction material according to an invention of claim 1 and claim 2.

Next, a ring-type friction material as a wet friction material according to the sixth to eighth modified examples of the second embodiment of the invention is described referring to FIG. 14. As shown in FIG. 14a, a wet friction material 6G according to the sixth modified example of the second embodiment of the invention is made by pressing both surfaces of ring-shaped friction material substrates 10 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9E, 9G, 9H and 9J (forty on one side) placing island shaped portions 8E, 8F, 8G and 8H in between.

At this point, it is applied chamfering processing 8Ga to the right outer peripheral corner portion of the island shaped portion 8G. Also, it is applied chamfering processing 8Ha to the left outer peripheral corner portion of the island shaped portion 8H. Therefore, the ring-type friction material 6G as a wet friction material according to the sixth modified example of the second embodiment of the invention formed the island shaped portions 8E, 8F, 8G and 8H corresponds with the wet friction material according to an invention of claim 1 and claim 2.

Moreover, as shown in FIG. 14b, a ring-type friction material 6H as a wet friction material according to the seventh modified example of the second embodiment of the invention is made by pressing both surfaces of ring-shaped friction material substrates 10 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9K (forty on one side) placing an island shaped portion 8F in between. Therefore, the ring-type friction material 6H as a wet friction material according to the seventh modified example of the second embodiment of the invention corresponds with the wet friction material according to an invention of claim 1.

Furthermore, as shown in FIG. 14c, a ring-type friction material 6J as a wet friction material according to the eighth modified example of the second embodiment of the invention is made by pressing both surfaces of ring-shaped friction material substrates 10 that normal friction material substrates for a wet friction material use are cut off, which are joined onto both surfaces of the steel core metal 2 of the flat ring shape along the entire circumference thereof with an adhesive (thermosetting resin), so as to form a plurality of oil grooves 9G, 9L (forty on one side) placing island shaped portions 8F, 8G in between. Therefore, the ring-type friction material 6J as a wet friction material according to the eighth modified example of the second embodiment of the invention corresponds with the wet friction material according to an invention of claim 1.

Accordingly, when ring-type friction materials 6, 6A, 6C, 6D, 6E, 6F, 6G, 6H and 6J according to the second embodiment of the invention are assembled into AT and rotate in either direction in a disengaged state, only the ring-type friction materials 6, 6A, 6C, 6D, 6E, 6F, 6G, 6H and 6J rotate smoothly so as to assure a distance between the ring-type friction materials 6, 6A, 6C, 6D, 6E, 6F, 6G, 6H and 6J and separator plates as ATF which supplies from the outer peripheral side is kept back at chamfering processing portions 8a, 8Aa, 8Ba, 8Ca, 8Da, 8Ea, 8Ga, and 8Ha and runs over to front surfaces of the island shaped portions 8, 8A, 8B, 8C, 8D, 8E, 8F, 8G, and 8H in case of a specification that there is no lubricating oil supply from the inner peripheral side.

Additionally, even in case of a specification that there is the lubricating oil (ATF) supply from the inner peripheral side, it can certainly prevent a drag torque from increasing by generating oil retained at the outer periphery because there is a sufficient space for the lubricating oil (ATF) to flow into the outer periphery of the ring-type friction materials 6, 6A, 6C, 6D, 6E, 6F, 6G, 6H and 6J.

Accordingly, in the ring-type friction materials 6, 6A, 6C, 6D, 6E, 6F, 6G, 6H and 6J as a wet friction material according to the second embodiment of the invention, it can obtain a more significant drag torque reduction effect more certainly even in case of the specification that there is no lubricating oil supply from the inner periphery (without axis core lubrication) or in case that a stirred torque increases by generating oil retained at the outer periphery.

Moreover, the ring-type friction materials 6, 6A, 6C, 6D, 6E, 6F, 6G, 6H and 6J as a press-type friction material according to the second embodiment of the invention are made by pressing both surfaces of ring-shaped friction material substrates 7, 10 joined onto both surfaces of the core metal 2 of the flat ring shape along the entire circumference thereof with an adhesive (thermosetting resin), therefore there is an advantage that the production is much easier and it can reduce the cost much more.

In the above each embodiment, in a wet friction material, only the segment-type friction material and the press-type friction material of the ring-type friction material are described. However, it can obtain an equivalent drag torque reduction effect as the ring-type (press-type) friction materials 6, 6A and 6C even in a cutting-type friction material of the ring type which is formed by cutting similar oil grooves.

Moreover, in the above each embodiment, as shown in FIG. 1, FIG. 3, FIG. 5, FIG. 6, FIG. 8, and FIG. 11 to FIG. 14, the wet friction material that segment pieces 3, 3A, 3B, 3C, 3D, 3E, 3F, 3G, 3H, 3J, 3K, 3L, 3M and 3N or ring-shaped friction material substrates 7, 10 are joined only onto a portion where it leans to the outer peripheral side of the core metal 2 is described. However, as described in the above patent publication No. 1 to No. 4, it can obtain an equivalent drag torque reduction effect as the above each embodiment even if it joins segment pieces or ring-shaped friction material substrates in a width which is over 90% of the width from the outer periphery to the inner periphery of the core metal 2 with an adhesive.

Additionally, even if it joins segment pieces or ring-shaped friction material substrates in a width which is only a certain percentage of the width from the outer periphery to the inner periphery of the core metal 2, it can obtain the equivalent drag torque reduction effect as the above each embodiment. Moreover, in the above each embodiment, it is described about the case that it joins segment pieces or ring-shaped friction material substrates onto both surfaces of the core metal 2. However, depending on the specification, it can join the segment pieces or the ring-shaped friction material substrates only onto one side of the core metal 2.

Furthermore, in the above each embodiment, it is described only about the case that thirty or forty pieces of the segment pieces are joined onto one side of the core metal 2 each and the case that thirty or forty oil grooves are formed each by joining ring-shaped friction material substrates. However, the number of the segment pieces of the core metal 2 is not limited to thirty or forty per one side, and the number of the oil grooves is not limited to thirty or forty also. It can set any numbers freely.

In the practice of this invention, it is not limited to the above each embodiment regarding a structure, a shape, a quantity, a material, a dimension, a connecting relation, a production method or the like of other portions of the wet friction material (segment-type friction material and ring-type friction material). Also, the numeric value which is described in the embodiment of this invention is not anything to indicate a critical value, but to indicate the preferred value that is suitable for enforcement. Therefore, it is not anything to deny the enforcement even if the numeric value mentioned above is changed a little.

The invention claimed is:
1. A wet friction material comprising:
a ring shaped flat metal core;
a plurality of segment-type friction material substrates joined onto one or both of surfaces of the ring shaped flat metal core with an adhesive and spaced apart along an entire circumference of the ring shaped flat metal core to form a plurality of oil grooves extending in a radial direction of the core metal by a clearance between adjacent ones of the above segment pieces
wherein one or both of outer peripheral corner portions of each of the plurality of segment-type friction material substrates is chamfered to form a chamfered part, wherein width of the oil grooves adjacent the chamfered part of the corner portions is at least four times larger than a width of a thinnest portion of the above plurality of the oil grooves.

2. A wet friction material according to claim 1, wherein a circumferential width of each chamfered part is 3 mm or more or 15% to 50% of the circumferential width of the segment piece and three times or more of the width of the thinnest portion of the above plurality of the oil grooves, and a radial width of each chamfered part is within a range of 20% to 100% of the radial width of the segment piece.

3. A wet friction material according to claim 1, further comprising a dent in the outer peripheral center portion of each segment.

4. A wet friction material comprising:
a ring shaped flat metal core; and
a ring-type friction material substrate joined onto one or both of surfaces of the ring shaped flat metal core with an adhesive, the ring-type friction material substrate having a plurality of dented (pressed or cut) parts to form a plurality of oil grooves extending in a radial direction of the core metal, a plurality of island shaped portions being formed between adjacent ones of the oil grooves;
wherein one or both of outer peripheral corner portions of each of the plurality of island shaped portions is chamfered to form a chamfered part, and
wherein width of the oil grooves adjacent the chamfered part of the corner portions is at least four times larger than a width of a thinnest portion of the above plurality of the oil grooves.

5. A wet friction material according to claim 4 wherein a circumferential width of each chamfered part is 3 mm or more or 15% to 50% of the circumferential width of the segment piece and three times or more of the width of the thinnest portion of the above plurality of the oil grooves, and a radial width of each chamfered part is within a range of 20% to 100% of the radial width of the above segment piece.

* * * * *